(12) United States Patent
Damnjanovic et al.

(10) Patent No.: US 9,209,955 B2
(45) Date of Patent: Dec. 8, 2015

(54) EXTENSION CARRIER AS A BANDWIDTH EXTENSION

(71) Applicant: QUALCOMM Incorporated, San Diego, CA (US)

(72) Inventors: Jelena Damnjanovic, San Diego, CA (US); Durga Prasad Malladi, San Diego, CA (US); Wanshi Chen, San Diego, CA (US); Peter Gaal, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 13/649,058

(22) Filed: Oct. 10, 2012

(65) Prior Publication Data

US 2013/0089048 A1 Apr. 11, 2013

Related U.S. Application Data

(60) Provisional application No. 61/546,029, filed on Oct. 11, 2011.

(51) Int. Cl.
| | |
|---|---|
| *H04J 3/16* | (2006.01) |
| *H04L 5/00* | (2006.01) |
| *H04L 1/18* | (2006.01) |

(52) U.S. Cl.
CPC .............. *H04L 5/0055* (2013.01); *H04L 5/001* (2013.01); *H04L 5/0023* (2013.01); *H04L 5/0053* (2013.01); *H04L 5/0092* (2013.01); *H04L 5/0094* (2013.01); *H04L 1/1822* (2013.01)

(58) Field of Classification Search
USPC .................................................. 370/310–350
See application file for complete search history.

(56) References Cited

U.S. PATENT DOCUMENTS

| | | | |
|---|---|---|---|
| 8,130,818 | B2 | 3/2012 | Chen |
| 8,204,025 | B2 * | 6/2012 | Cai et al. ...................... 370/337 |
| 2009/0232071 | A1 * | 9/2009 | Cho et al. ...................... 370/329 |
| 2011/0007695 | A1 * | 1/2011 | Choi et al. .................... 370/329 |
| 2011/0090854 | A1 | 4/2011 | Montojo et al. |
| 2011/0103243 | A1 | 5/2011 | Larsson et al. |
| 2011/0103330 | A1 | 5/2011 | Montojo et al. |

(Continued)

FOREIGN PATENT DOCUMENTS

| | | |
|---|---|---|
| JP | 2013516820 A | 5/2013 |
| KR | 20100106364 A | 10/2010 |

(Continued)

OTHER PUBLICATIONS

International Search Report and Written Opinion—PCT/US2012/059768—ISA/EPO—Jan. 7, 2013.

(Continued)

*Primary Examiner* — Kwang B Yao
*Assistant Examiner* — Juvena Loo
(74) *Attorney, Agent, or Firm* — Arent Fox LLP

(57) ABSTRACT

A method, an apparatus, and a computer program product for wireless communication are provided. The apparatus receives extended bandwidth information indicating availability of an extended bandwidth. The extended bandwidth includes a base carrier and an extension carrier within a legacy guard band of the base carrier. The apparatus receives data on a downlink in the extension carrier based on the extended bandwidth information.

73 Claims, 24 Drawing Sheets

(56) References Cited

U.S. PATENT DOCUMENTS

| | | | |
|---|---|---|---|
| 2011/0103333 A1* | 5/2011 | Berggren et al. | 370/329 |
| 2011/0149894 A1 | 6/2011 | Luo et al. | |
| 2011/0151913 A1* | 6/2011 | Forster et al. | 455/509 |
| 2011/0205995 A1* | 8/2011 | Grovlen | 370/329 |
| 2011/0243090 A1* | 10/2011 | Grovlen et al. | 370/329 |
| 2012/0039268 A1* | 2/2012 | Hakkinen et al. | 370/329 |
| 2012/0087331 A1 | 4/2012 | Seo et al. | |
| 2012/0099520 A1 | 4/2012 | Kwon et al. | |
| 2013/0039188 A1* | 2/2013 | Larsson et al. | 370/241 |
| 2013/0176952 A1* | 7/2013 | Shin et al. | 370/329 |
| 2013/0265982 A1* | 10/2013 | Fwu et al. | 370/329 |
| 2014/0362818 A1* | 12/2014 | Onggosanusi et al. | 370/329 |

FOREIGN PATENT DOCUMENTS

| | | |
|---|---|---|
| KR | 20110084892 A | 7/2011 |
| WO | 2011082814 A1 | 7/2011 |
| WO | 2011093093 A1 | 8/2011 |

OTHER PUBLICATIONS

Translation of Office Action for Japanese Patent Application No. 2014-535879 dated Jun. 16, 2015, 8 pages.

Translation of Notice of Grounds for Rejection for Korean Application No. 2014-7012609, dated Mar. 26, 2015, 5 pages.

Decision for Grant of Patent from Korean Application No. 2014-7012609, dated Sep. 23, 2015, 3 pages.

* cited by examiner

EXTENSION CARRIER AS A BANDWIDTH EXTENSION

CROSS-REFERENCE TO RELATED APPLICATION(S)

This application claims the benefit of U.S. Provisional Application Ser. No. 61/546,029, entitled "EXTENSION CARRIER AS A SIMPLE BANDWIDTH EXTENSION" and filed on Oct. 11, 2011, which is expressly incorporated by reference herein in its entirety.

BACKGROUND

1. Field

Aspects of the present disclosure relate generally to wireless communication systems, and more particularly, to an extension carrier bandwidth extension.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

In an aspect of the disclosure, a method, a computer program product, and an apparatus are provided. The apparatus receives extended bandwidth information indicating availability of an extended bandwidth. The extended bandwidth includes a base carrier and an extension carrier within a legacy guard band of the base carrier. The apparatus receives data on a downlink in the extension carrier based on the extended bandwidth information.

DETAILED DESCRIPTION

Figure 1:
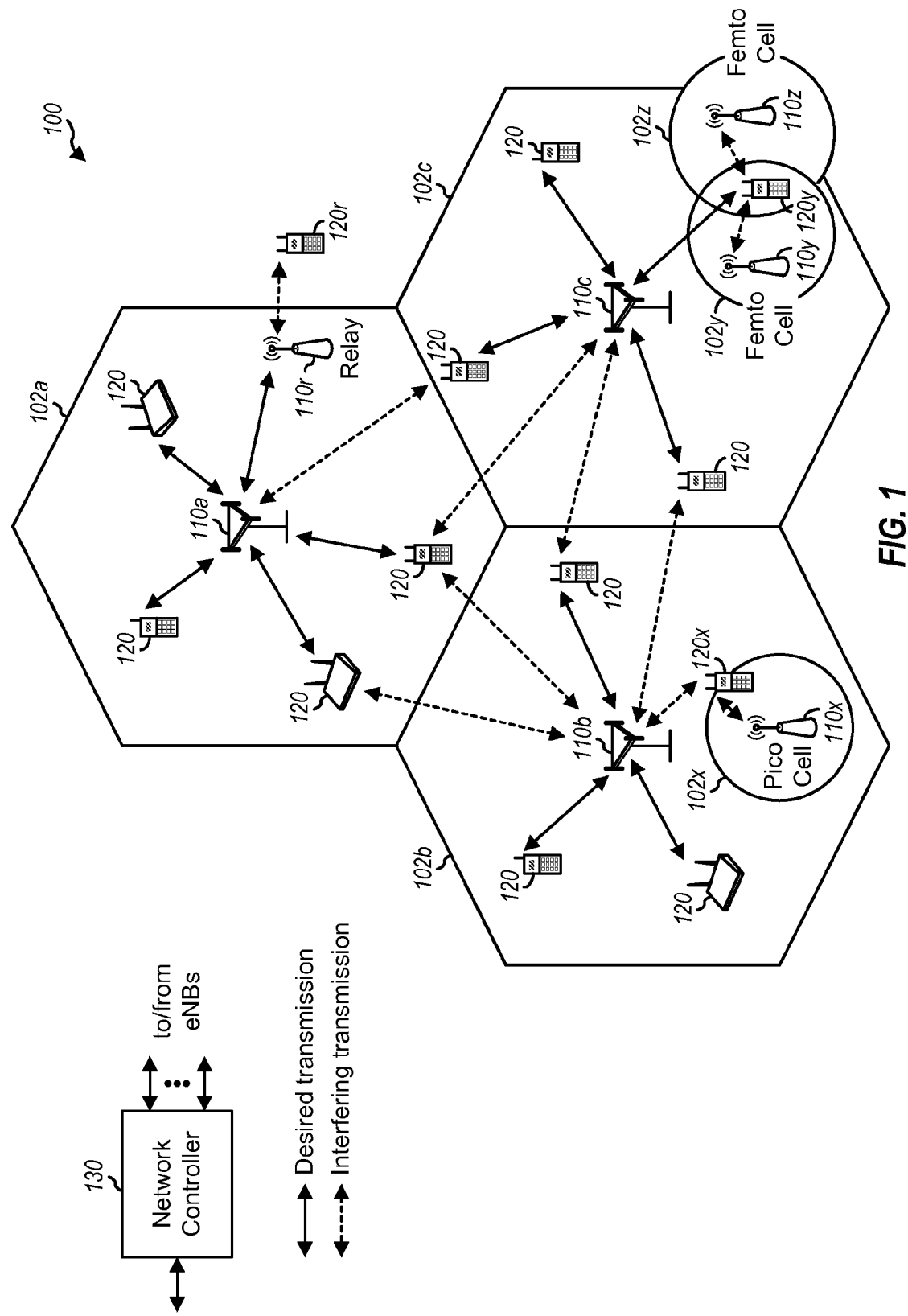
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Briefly and in general terms, with reference to Appendix, attached herewith and incorporated herein in its entirety, different carrier aggregation (CA) techniques are presented for TDD-FDD CA in various network settings. For example, CA of FDD/TDD carriers for regular UEs and at the same time TDD spectrum utilization for relaying/P2P communication. A UE may be used as a relay in an eNB and another UE communication. eNB may activate a UE to act as a relay for communication with another UE. Activation may be based on the proximity detection between UEs that may be performed among UEs and/or with eNB assistance. Activation may also be prompted as a result of the P2P communication among UEs. The benefits of the may scheme include being able to use much of LTE Rel-10 framework, being able to perform CA on the eNB-UE link, with extension to TDD-FDD aggregation while performing regular Rel-10 TDD operation on the UE-UE link. In one aspect, the relaying UE may be a high category UE, supporting the relay functionality (or some of it). In one aspect, the proposed method may facilitate improved utilization of the TDD and FDD spectrum, thereby providing wider data bandwidth for eNB-UE communication due to CA. In one aspect, interference on UE-UE communication may be protected. In one aspect, increased coverage may be provided for some UEs. In one aspect, peer-to-peer communication between two UEs, without an intermediate eNB may result in traffic offload. In one aspect, the previously described benefits may be obtained while being backward compatible with LTE Rel-10 deployments.

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110$a$, 110$b$ and 110$c$ may be macro eNBs for the macro cells 102$a$, 102$b$ and 102$c$, respectively. The eNB 110$x$ may be a pico eNB for a pico cell 102$x$. The eNBs 110$y$ and 110$z$ may be femto eNBs for the femto cells 102$y$ and 102$z$, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110$r$ may communicate with the eNB 110$a$ and a UE 120$r$ in order to facilitate communication between the eNB 110$a$ and the UE 120$r$. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
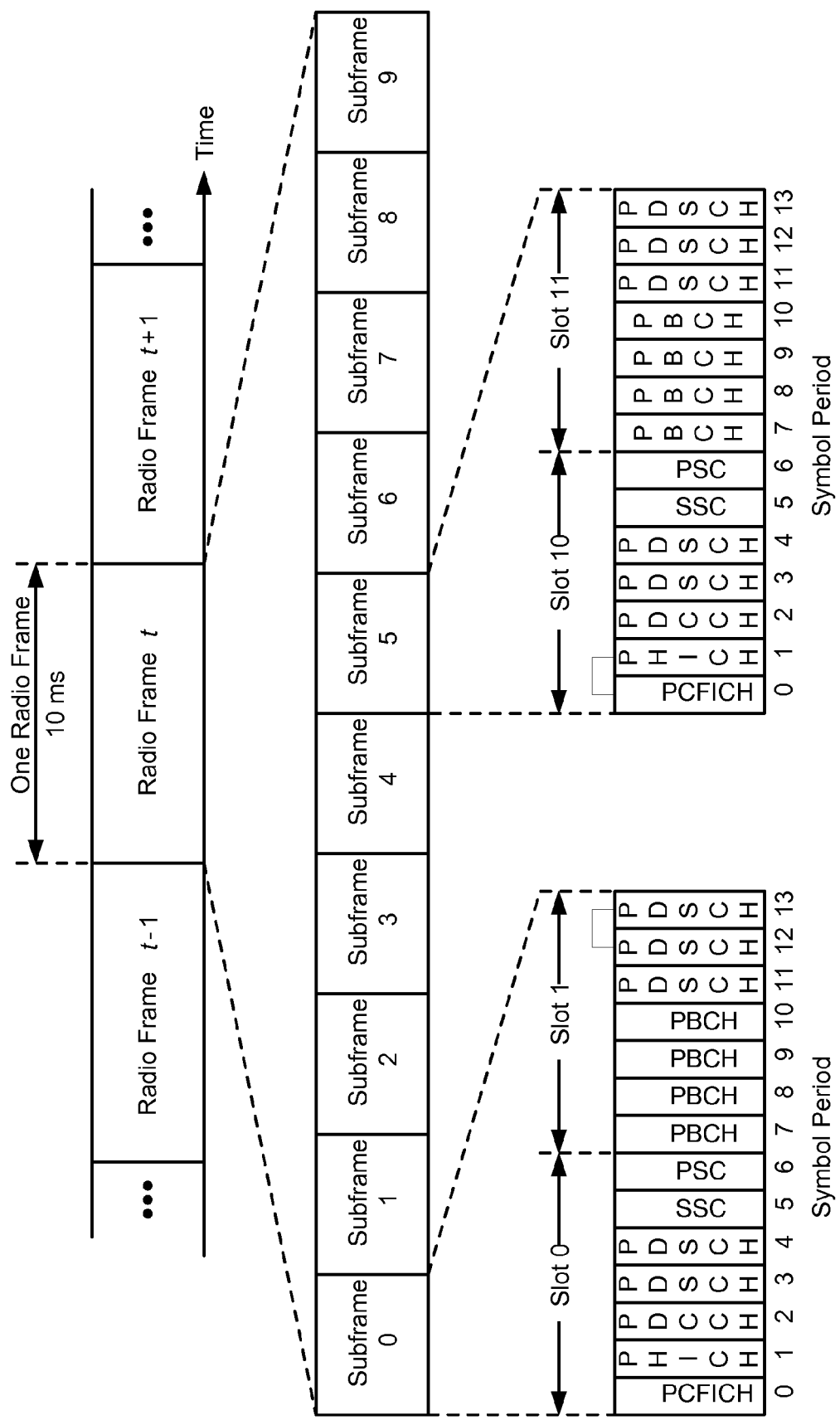
FIG. 2 is a block diagram conceptually illustrating an example of a downlink frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a PDSCH in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
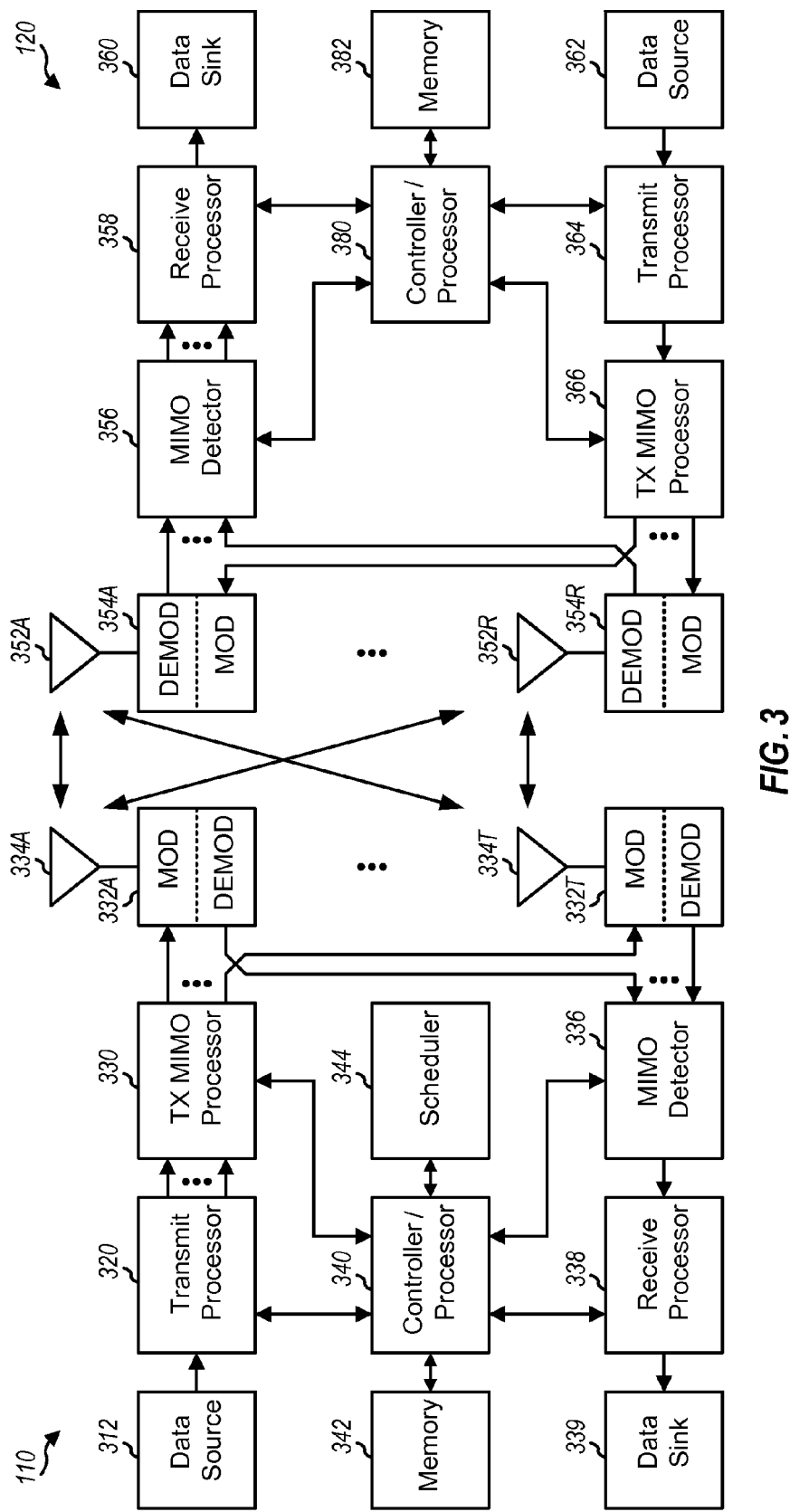
FIG. 3 is a block diagram conceptually illustrating a design of a base station/evolved Node B (eNB) and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Carrier Aggregation

LTE-Advanced UEs use spectrum in 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Carrier Aggregation Types

Figure 4A:
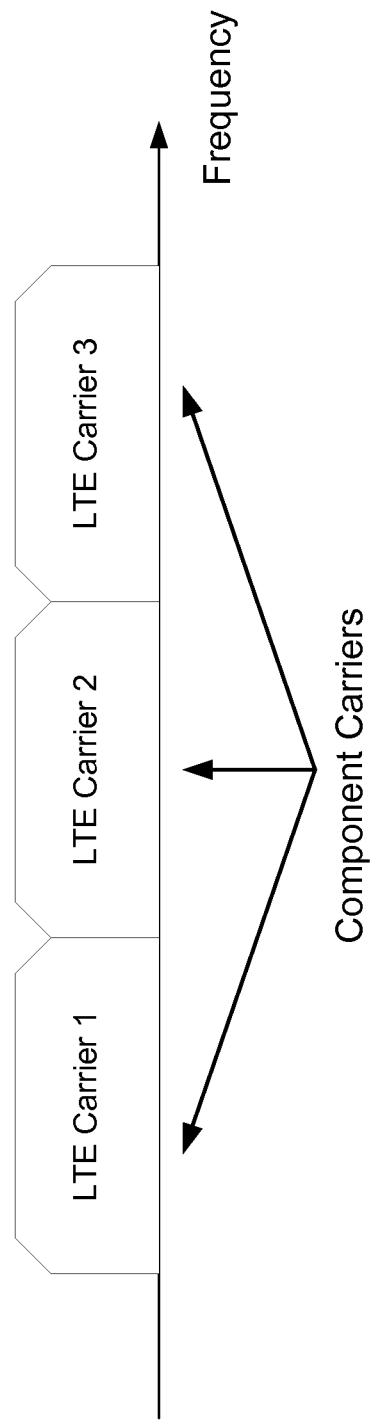
FIG. 4A discloses a continuous carrier aggregation type.
Figure 4B:
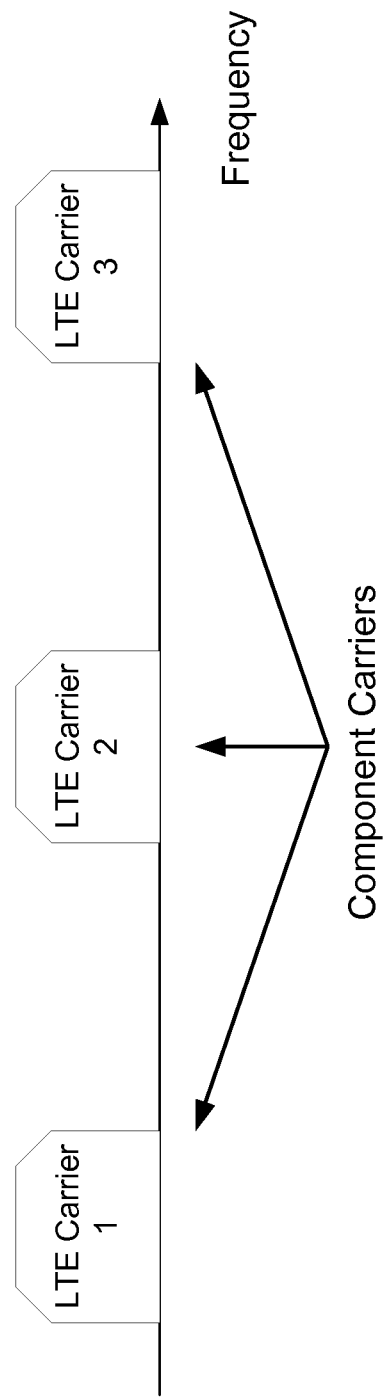
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the eNB has fixed transmitting power on each component carrier, the effective coverage or supportable modulation and coding of each component carrier may be different.

Data Aggregation Schemes

Figure 5A:
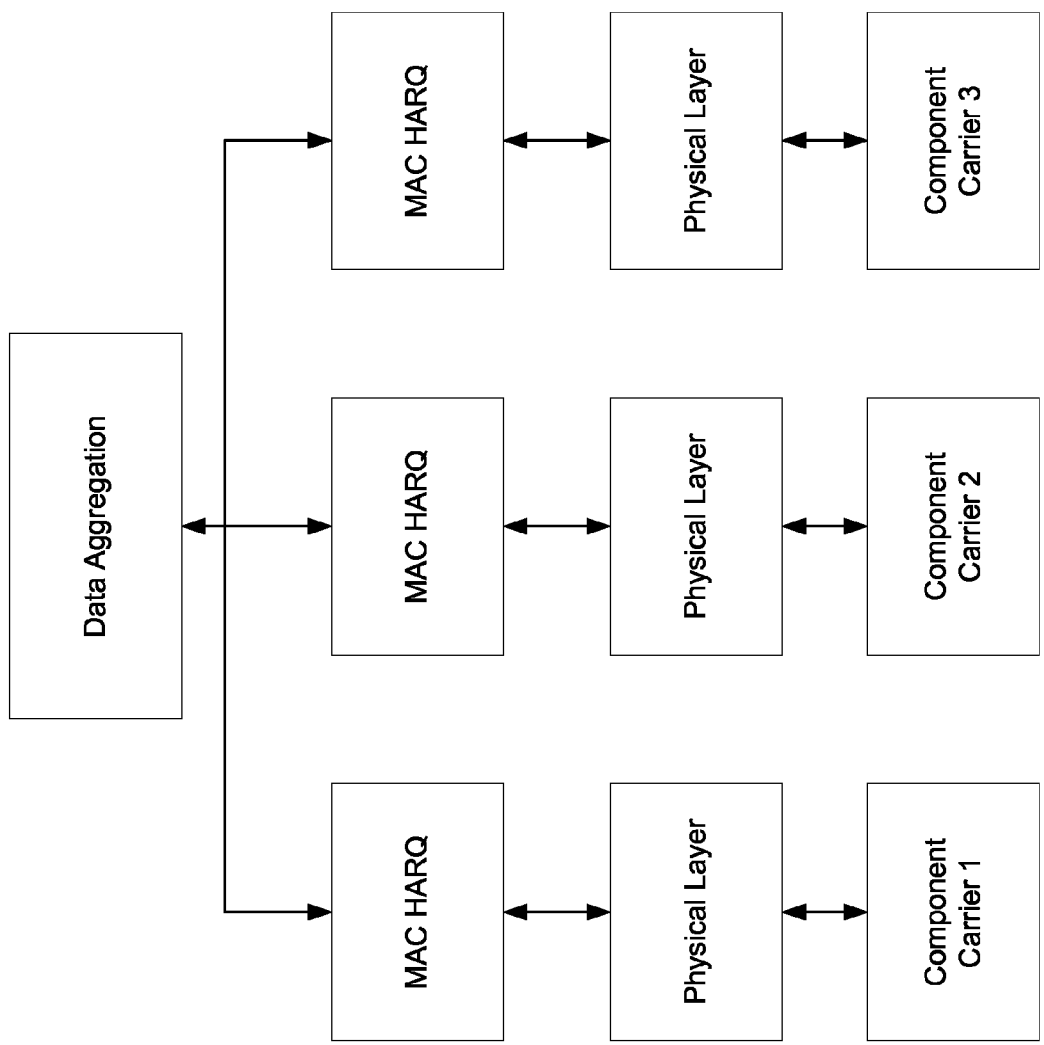
FIG. 5A discloses MAC layer data aggregation.

FIG. 5A illustrates aggregating transmission blocks (TBs) from different component carriers at the medium access control (MAC) layer for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Figure 5B:
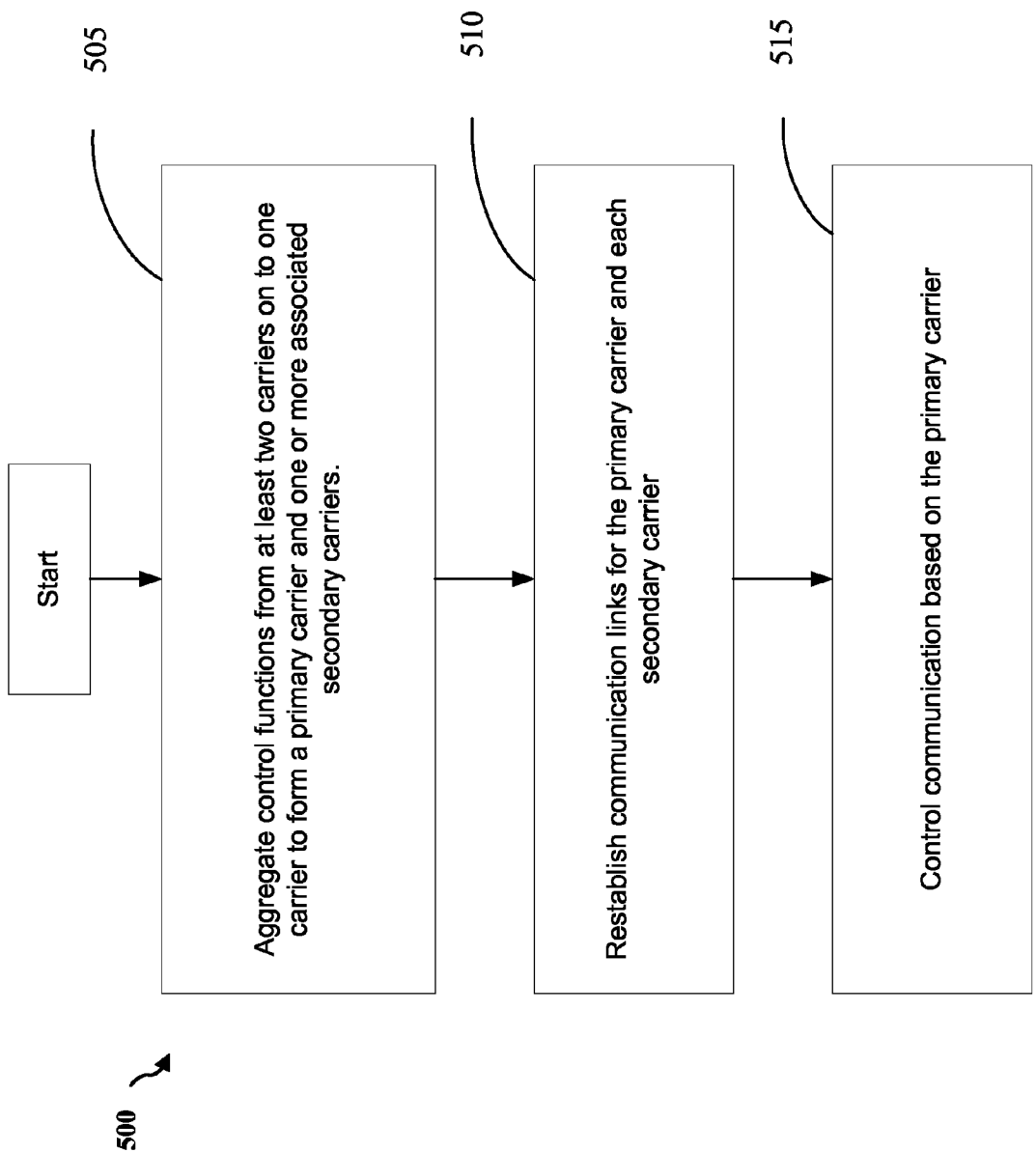
FIG. 5B is a block diagram illustrating a method for controlling radio links in multiple carrier configurations.

FIG. 5B illustrates a method 500 for controlling radio links in a multiple carrier wireless communication system by grouping physical channels according to one example. As shown, the method includes, at block 505, aggregating control functions from at least two carriers onto one carrier to form a primary carrier and one or more associated secondary carriers. Next at block, 510, communication links are established for the primary carrier and each secondary carrier. Then, communication is controlled based on the primary carrier in block 515.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Certain conventional wireless communication standards, such as the current version of Long Term Evolution (LTE) Release 10 (Rel-10) allow for aggregation of time domain duplexing (TDD) only or frequency domain duplexing (FDD) only component carriers (CCs). However, as the demand on wireless bandwidth increases, additional techniques may be needed. Aggregating CCs in the time and/or frequency domains (e.g., frequency domain duplexing, FDD, or time domain duplexing, TDD, aggregation) may be a technique used to address the increased demand on bandwidth, among others.

Figures 6A, 6B:
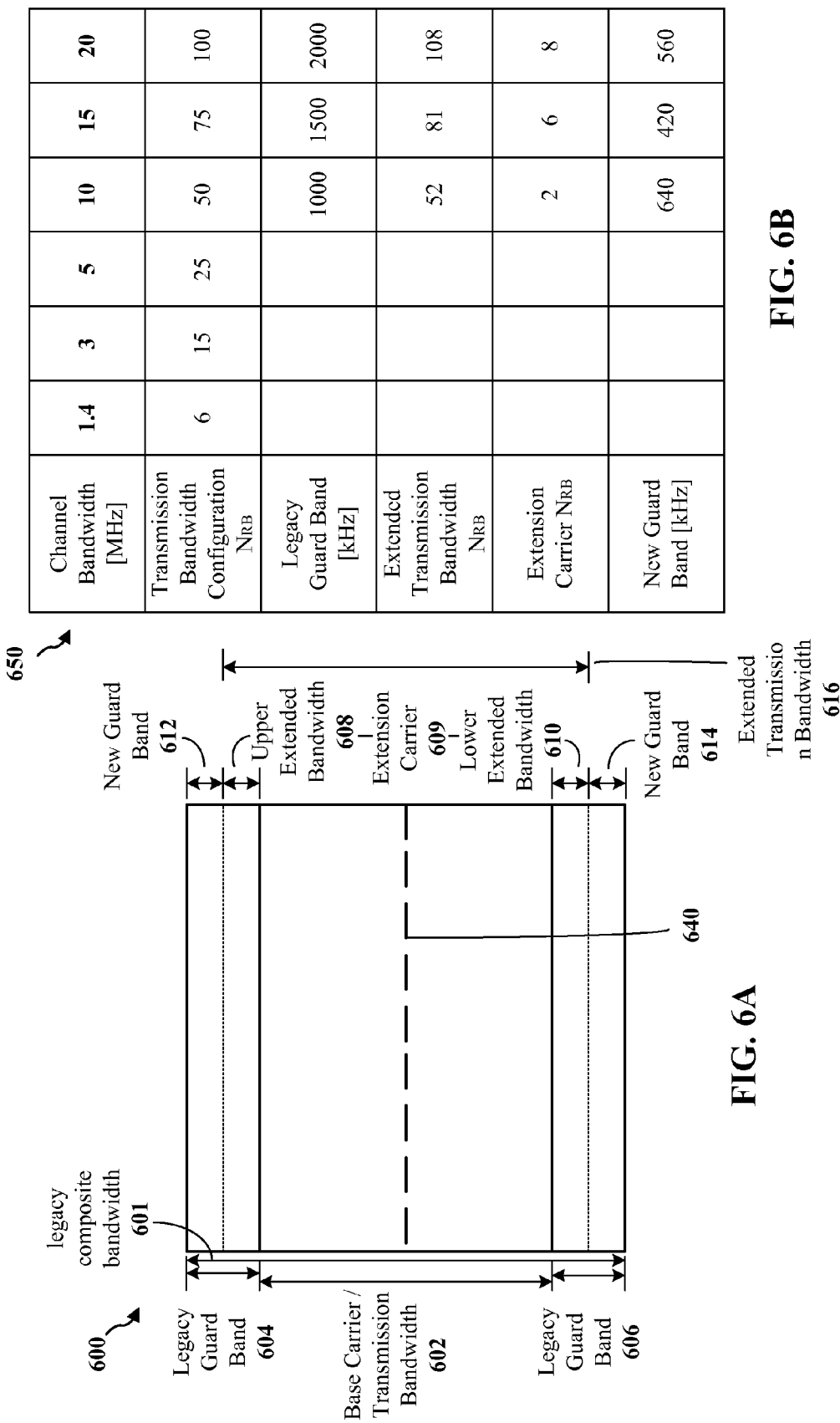
FIG. 6A is a diagram illustrating an extension carrier.
FIG. 6B is a table illustrating exemplary parameters associated with FIG. 6A for various channel bandwidths.

FIG. 6A is a diagram 600 illustrating an extension carrier. As shown in FIG. 6A, a legacy composite bandwidth 601 includes a base carrier/base transmission bandwidth 602, an upper legacy guard band 604, and a lower legacy guard band 606. In an exemplary method, portions of the legacy guard bands 604, 606 may be used by an extension carrier 609. The extension carrier 609 includes an upper extended bandwidth 608 and a lower extended bandwidth 610. In the exemplary method, the transmission bandwidth may be extended from the base transmission bandwidth 602 to an extended transmission bandwidth 616 by the upper extended bandwidth 608 in the upper legacy guard band 604 and the lower extended bandwidth 610 in the lower legacy guard band 606. The extension carrier 609 is within the legacy guard bands 604, 606 and therefore the extended transmission bandwidth 616 has smaller new guard bands 612, 614 than the legacy guard bands 604, 606.

An extension carrier is a carrier that cannot be operated as a single carrier (stand-alone), but must be a part of a component carrier set where at least one of the carriers in the set is a stand-alone capable component carrier. The base carrier 602 may be such a stand-alone capable component carrier, and thus the extension carrier 609 may be operated as part of a component carrier set that includes the extension carrier 609 and the base component carrier 602. The extension carrier 609 is not backwards compatible with UEs configured for legacy operation. The linkage between the base component carrier 602 and the extension carrier 609 may be per UE and configured through radio resource control (RRC) signaling. The extension carrier 609 may have cross-carrier control from a configured component carrier, such as the base component carrier 602. In such a configuration, the extension carrier 609 may have no control channels. The extension carrier 609 may carry common reference signals (CRS). The extension carrier 609 may be unicast only, without carrying multicast or broadcast content. Further, the extension carrier 609 may not carry paging information, a primary synchronization signal (PSS), or a secondary synchronization signal (SSS). Synchronization may be performed based on PSS/SSS in the base carrier 602. System information associated with the extension carrier 609 may be delivered through dedicated RRC signaling. The extension carrier 609 may include downlink and uplink extension carriers. A size of the extension carrier 609 may have one resource block (RB) granularity (each RB is 180 kHz). That is, the upper extended bandwidth 608 and the lower extended bandwidth 610 may each include N RBs, where N is a positive integer.

The bandwidth 601 may be utilized concurrently by both UEs configured for legacy operation and UEs configured for non-legacy operation. UEs that support only legacy operation operate only on the base transmission bandwidth 602 with the legacy guard bands 604, 606. UEs that support only non-legacy operation operate only on the extended transmission bandwidth 616 with the non-legacy guard bands 612, 614. UEs that support both legacy operation and non-legacy operation can operate on either the base transmission bandwidth 602 with the legacy guard bands 604, 606 or the extended transmission bandwidth 616 with the non-legacy guard bands 612, 614. Herein, "legacy UEs" are UEs that support only legacy operation, and "non-legacy UEs" are UEs that support both legacy operation and non-legacy operation. Legacy UEs are configured for legacy operation. Non-legacy UEs may be configured for legacy operation or non-legacy operation.

FIG. 6B is a table 650 illustrating exemplary parameters associated with FIG. 6A for various channel bandwidths. In general, the composite bandwidth including the extended transmission bandwidth 616 and the new guard bands 612, 614 may be less than or equal to 110 RBs, as a single grant currently supports a bandwidth of up to 110 RBs. The bandwidth extension is achieved by utilizing additional RBs in the legacy (e.g., Rel-8) guard band. The exemplary methods apply generally to larger bandwidth systems, such as for example 20 MHz. The extension carrier 609 may be contiguous to the base carrier 602 such that there are no guard bands between the base carrier 602 and the extension carrier 609. The extension carrier 609 may have a relatively small number of RBs (e.g., less than 7 RBs) so that the new guard band 612, 614 is of sufficient size. The table 650 provides exemplary parameters for the extended transmission bandwidth, extension carrier, and new guard band for various channel bandwidths. As shown in the table 650, the new guard band 612, 614 does not have to be proportional to the usable extended transmission bandwidth 616. For example, for a 10 MHz channel bandwidth, the new guard band may be 640 kHz (320 kHz on each side), while for 20 MHz channel bandwidth, the new guard band may be 560 KHz (280 kHz of each side). The extension carrier 609 maintains symmetry with respect to a DC component 640 of the base carrier 602. As such, the upper extended bandwidth 608 and the lower extended bandwidth 610 each have an equal number of RBs. For example, when the channel bandwidth is 20 MHz, 8 RBs may be dedicated for the extension carrier 609, with 4 RBs used in the upper extended bandwidth 608 and 4 RBs used in the lower extended bandwidth 610. When the upper extended bandwidth 608 and the lower extended bandwidth 610 have an equal number of RBs, the total number of RBs of the extension carrier 609 is even, and thus when the base transmission bandwidth 602 has an even number of RBs, the extended transmission bandwidth 616 also has an even number of RBs, and when the base transmission bandwidth 602 has an odd number of RBs, the extended transmission bandwidth also has an odd number of RBs. Such a relationship maintains symmetry around the DC component 640 of the base carrier 602.

Figure 7:
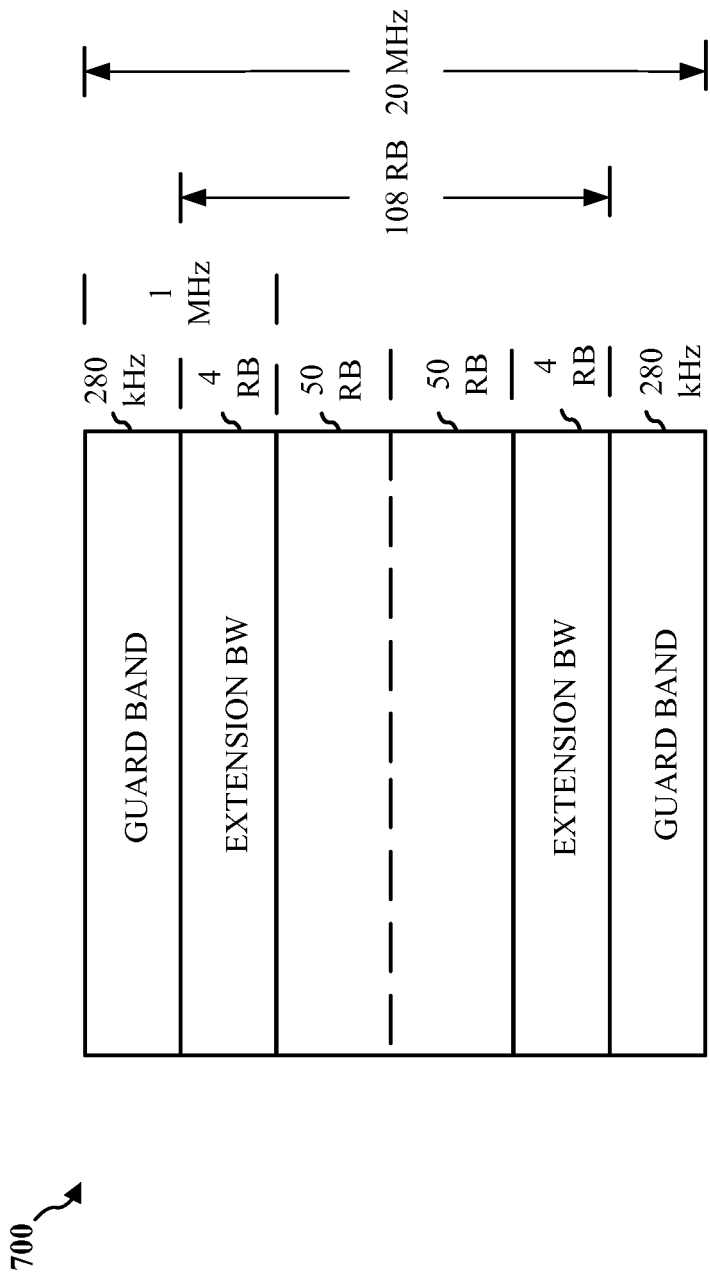
FIG. 7 is a diagram illustrating a particular example of bandwidth allocation with an extension carrier.

FIG. 7 is a diagram 700 illustrating a particular example of bandwidth allocation with an extension carrier. As shown in FIG. 7, when the channel bandwidth is 20 MHz, the base transmission bandwidth may include 100 RBs, each of the upper and lower portions of the extended bandwidth may include 4 RBs, and the upper and lower guard bands may each extend 280 kHz. The 4 RBs extend across 4*180 kHz of the 1 MHz legacy guard band, thus leaving a new guard band of 280 KHz on each side.

Figure 8:
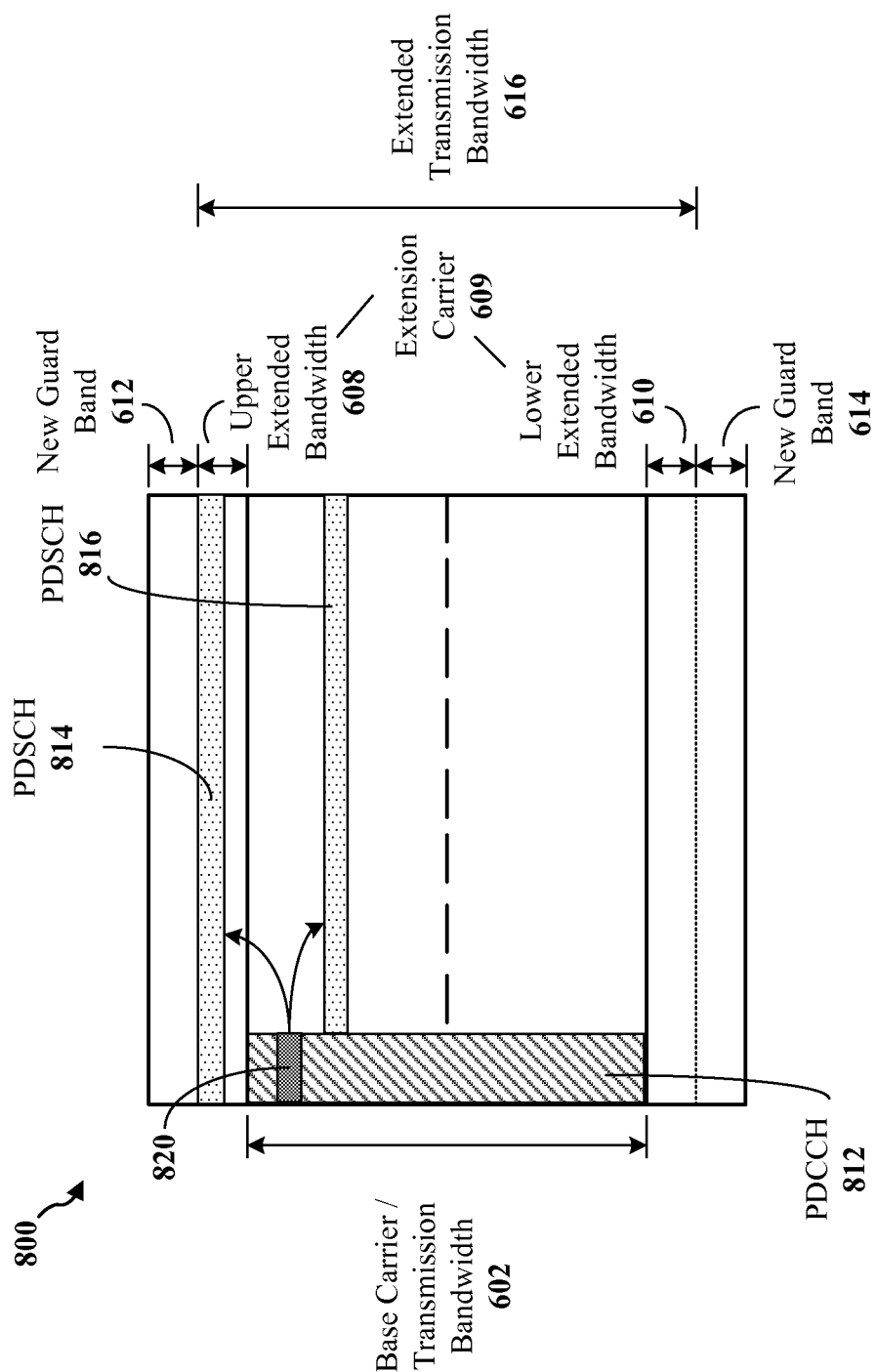
FIG. 8 is a diagram illustrating a physical downlink shared channel (PDSCH) received in the extension carrier.

FIG. 8 is a diagram 800 illustrating a PDSCH received in the extension carrier. As shown in FIG. 8, the extension carrier 609 may be used by a non-legacy UE to receive the PDSCH 814. The base carrier 602 may be used by a legacy UE or a non-legacy UE to receive the PDSCH 816. The PDCCH 812 may extend across the base carrier 602 and include control information 820 pertaining to the PDSCHs 814, 816. When the extension carrier 609 is used for data only (no control), payload sizes may be adjusted from that used in the base carrier 602, as all of the OFDM symbols are used for data.

Figure 9:
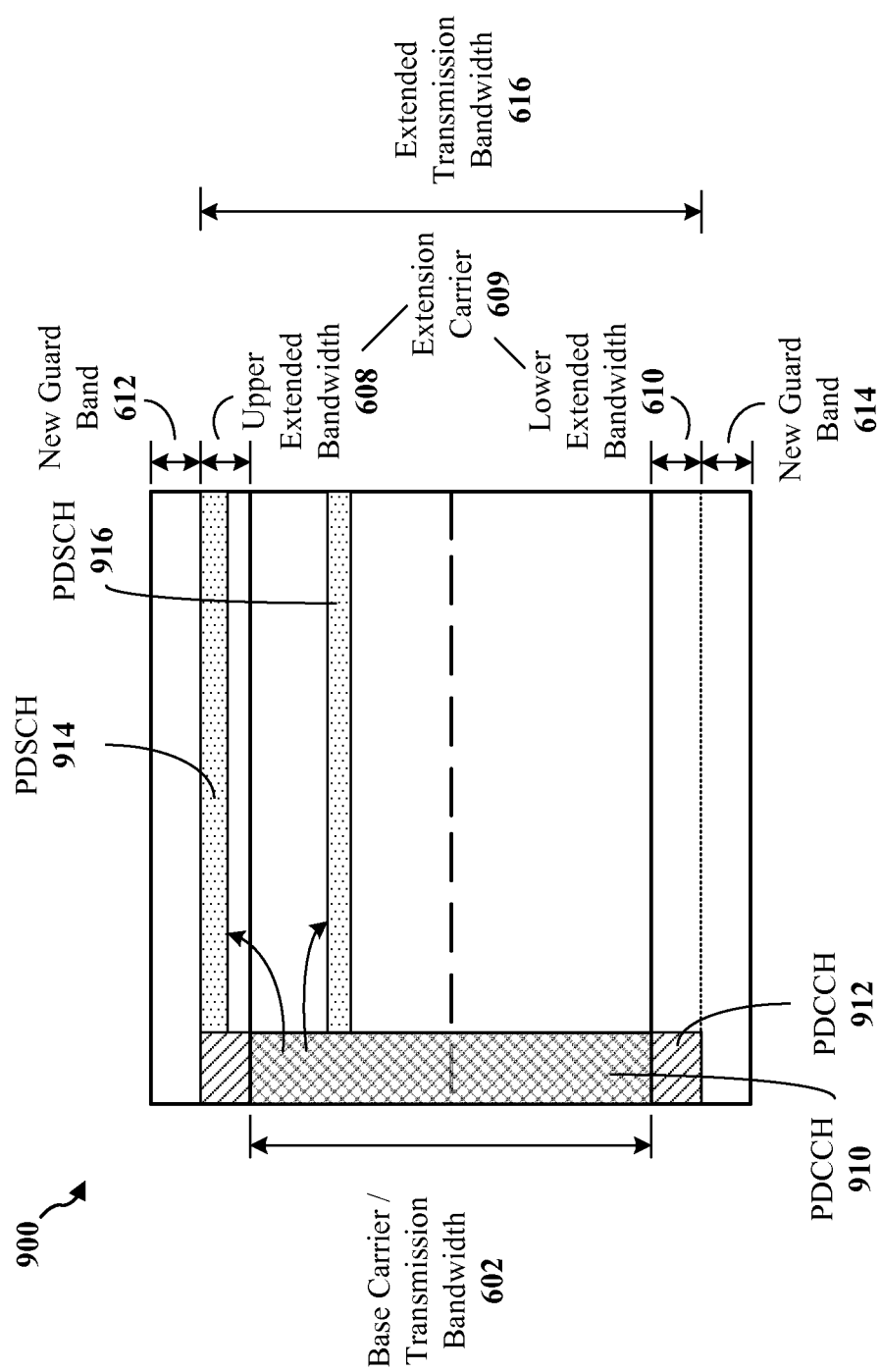
FIG. 9 is a diagram illustrating a control region for UEs supporting legacy operation and a control region for UEs supporting non-legacy operation within the context of an extended bandwidth.

FIG. 9 is a diagram 900 illustrating a control region for legacy UEs and control region for non-legacy UEs within the context of an extended bandwidth. The extension carrier 609 may include a control region 912 that extends across the extended transmission bandwidth 616. In such a configuration, legacy and non-legacy UEs may receive control information in the PDCCH 910 in the base transmission bandwidth 602 and non-legacy UEs may receive control information in the PDCCH 912 in the extended transmission bandwidth 616. The control information within the PDCCH 912 pertain to the PDSCH 914. The control information within the PDCCH 912 may pertain to the PDSCH 916 when the PDSCH 916 is received by a non-legacy UE. The control information within the PDCCH 910 may pertain to the PDSCH 916 when the PDSCH 916 is received by a legacy UE.

The control region size (i.e., number of OFDM symbols) may be uniform across the extended transmission bandwidth 616. Alternatively, the control region size may be different in the extension carrier 609 than in the base carrier 602. When the control region size is uniform across the extended transmission bandwidth 616, the same PCFICH value (e.g., 1, 2, or 3 OFDM symbols) that applies in the base carrier 602 may also apply in the extension carrier 609. The PCFICH may be received only in the base carrier 602. Alternatively, the PCFICH may extend across the extended transmission bandwidth 616. When the control region size is different in the base carrier 602 and the extension carrier 609, non-legacy UEs may receive the control region size of the extension carrier 609 through RRC signaling. In such a configuration, there is no PCFICH in the extension carrier 609.

With respect to the PHICH for acknowledgment (ACK)/negative acknowledgment (NACK) feedback, the PHICH may not be carried on the extension carrier 609 or may extend across the extended transmission bandwidth 616. When there is no PHICH on the extension carrier 609, the PHICH spans only the base carrier 602 and ACK/NACK for uplink transmission relies on the PHICH mapped on the base carrier 602. When the PHICH spans the extended transmission bandwidth 616, only non-legacy UEs may receive the PHICH (i.e., not backwards compatible). Generally, there are three options when the extension carrier 609 is used for control: (1) TDM partitioning between legacy UEs that are not capable of receiving the extended transmission bandwidth 616 and non-legacy UEs capable of receiving the extended transmission bandwidth 616; (2) two independent control regions defined, with one in the base carrier 602 and one in the extended carrier 609; and (3) control channels spanning the base transmission bandwidth 602 and the extended transmission bandwidth 616 are multiplexed together in the same subframe, and CCE partitioning is used.

TDM Partitioning Between Legacy UEs and Non-Legacy UEs

Figure 10:
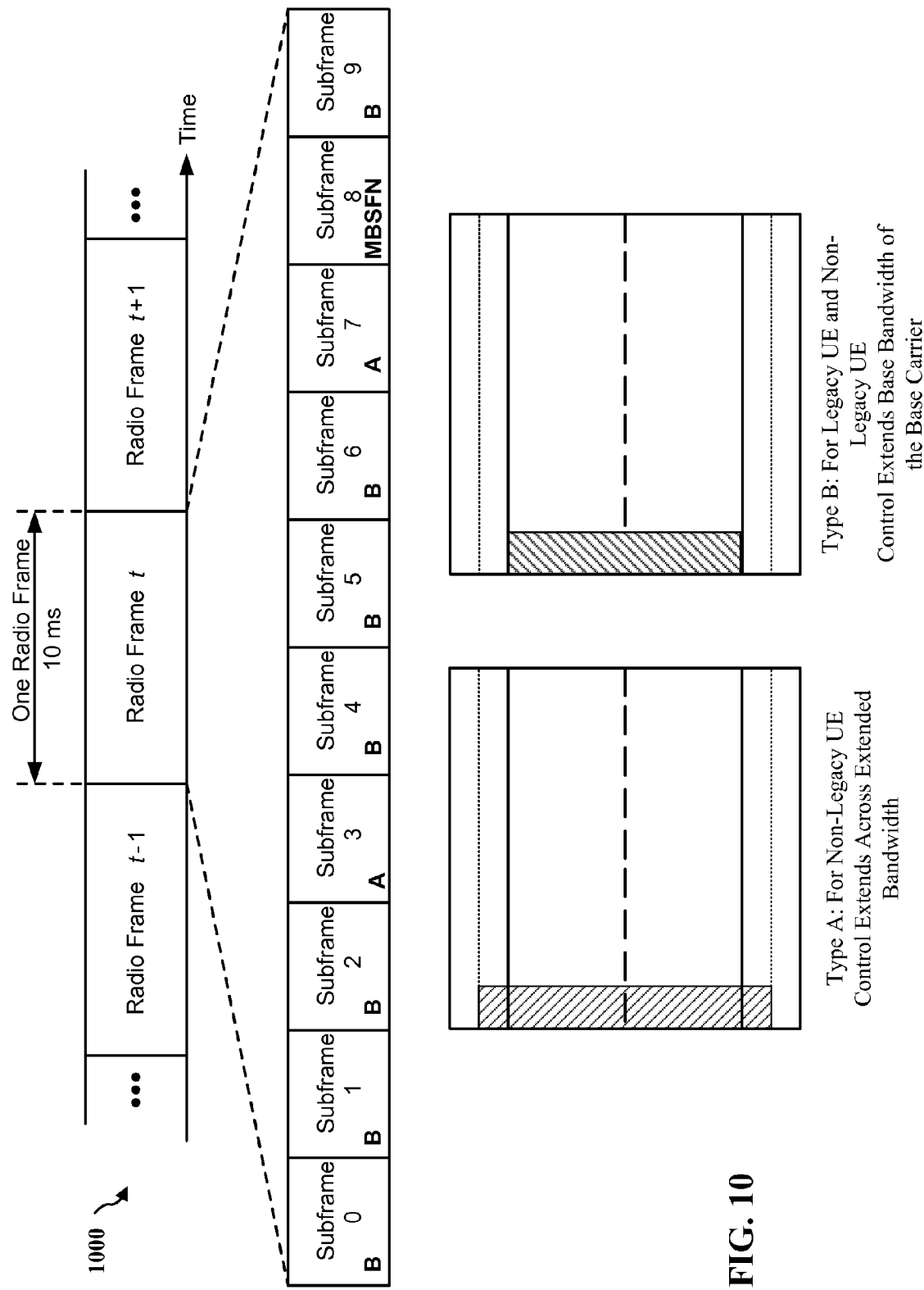
FIG. 10 is a diagram for illustrating time division multiplexing (TDM) between legacy UEs and non-legacy UEs.

FIG. 10 is a diagram 1000 for illustrating TDM between legacy UEs and non-legacy UEs. There may be two different types of unicast subframes, non-legacy subframes (type A) in which the control region spans the extended transmission bandwidth 616 and legacy subframes (type B) in which the control region spans the base transmission bandwidth 602. Type B subframes support legacy operation. In type A subframes, only UEs capable of supporting the extended transmission bandwidth 616 are multiplexed. As shown in FIG. 10, in the subframes 3, 7, the control region spans the extended transmission bandwidth, whereas in the subframes 0, 1, 2, 4, 5, 6, and 9, the control region spans the base transmission bandwidth 602. As such, for unicast transmissions, legacy UEs may receive/transmit in the subframes 0, 1, 2, 4, 5, 6, and 9, whereas non-legacy UEs may receive/transmit unicast content in all of the subframes, with the exception of the Multicast Broadcast Single Frequency Network (MBSFN) subframe 8, which is for multicast/broadcast content. For type B subframes, non-legacy UEs may receive PDSCH in the extension carrier that extends across all the OFDM symbols (see FIG. 8), wherein in type A subframes, non-legacy UE's may receive PDSCH in the extension carrier that extends across all the non-control OFDM symbols (see FIG. 9). The subframe configuration may be provided semi-statically through system information (SI) (e.g., system information blocks (SIBs)) and/or RRC signaling. Alternatively, the subframe configuration may be dynamically changed from subframe to subframe. For dynamic subframe configuration, non-legacy UEs can determine whether a subframe is of type A or type B through blind decoding. That is, a non-legacy UE can try to decode its PDCCH search spaces with the various possible PDCCH formats and determine whether a subframe is type A or type B based on which PDCCH search space was successfully decoded.

For the TDM partitioning option, the scheduler of the eNB makes sure that the HARQ timeline for downlink/uplink is kept within the subframes the UE supports. Non-legacy UEs should monitor all unicast subframes with varying bandwidth (type A and type B). Legacy UEs should monitor only legacy unicast subframes (type B). The control region size may be uniform across the extended transmission bandwidth 616 for the non-legacy subframes. The same PCFICH value may apply to the control regions in the base carrier 602 and the extended carrier 609. A single PCFICH may span the extended transmission bandwidth 616. The PHICH, which carries ACK/NACK feedback on downlink, may span the extended transmission bandwidth 616.

Independent Control Regions for Base Carrier and Extended Carrier

Figure 11:
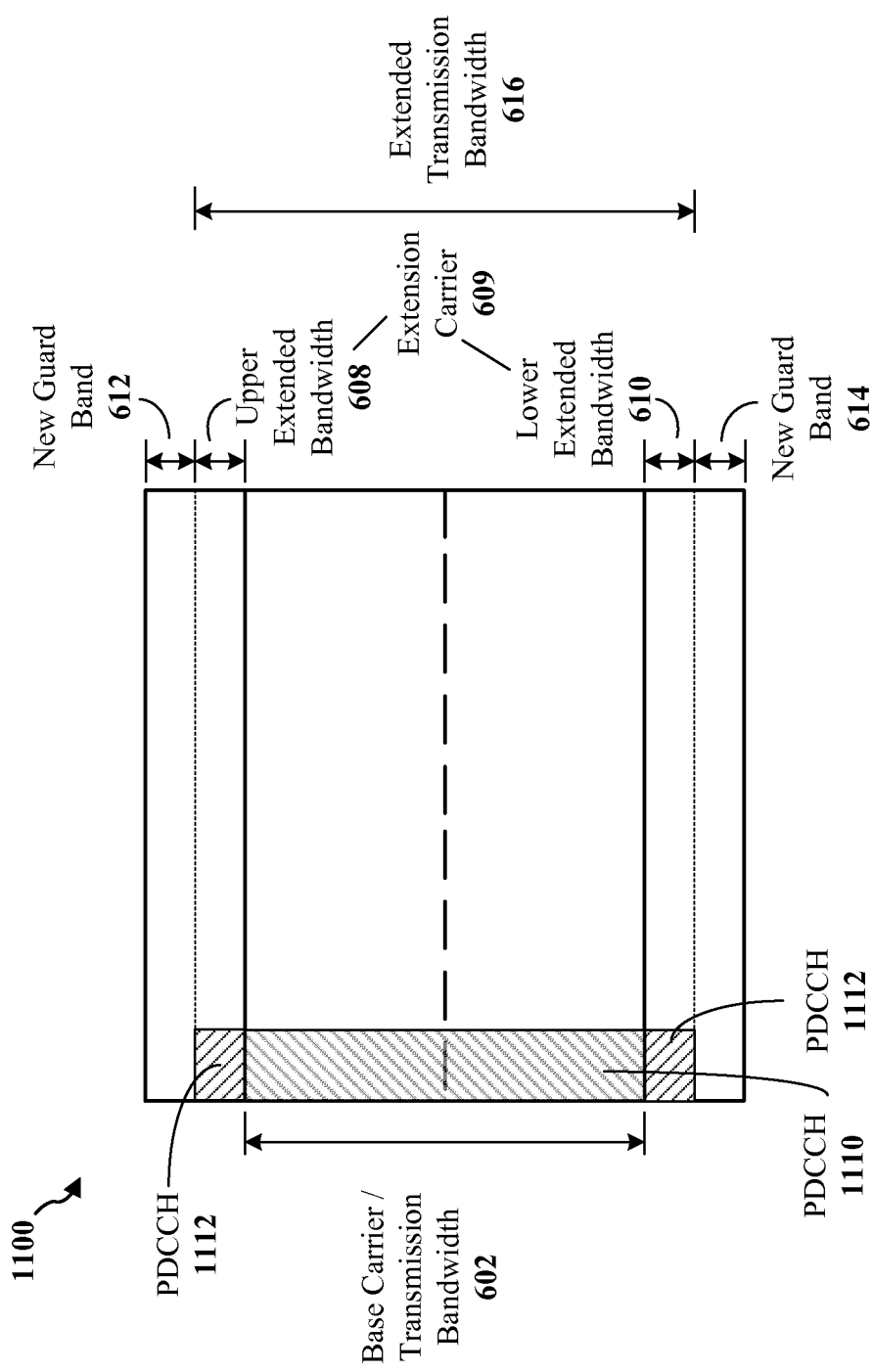
FIG. 11 is a diagram for illustrating independent control regions within the context of an extended bandwidth.

FIG. 11 is a diagram 1100 for illustrating independent control regions within the context of an extended bandwidth. In a second option, independent control regions may be defined, with a first independent PDCCH 1110 in the base carrier 602 and a second independent PDCCH 1112 in the extension carrier 609 (assuming the extension carrier 609 is at least 6 RBs wide, with at least 3 RBs in the upper extended bandwidth 608 and 3 RBs in the lower extended bandwidth 610). Non-legacy UEs can be configured to monitor both of the control regions 1112, 1110, i.e., non-legacy UEs may receive PDCCH on the base carrier 602 or the extension carrier 609. Thus, two independent control regions are defined.

As discussed supra, there are multiple PDCCH formats. The format used may not be known a priori to the UE. Thus, the UE must blind decode various CCE locations assuming various PDCCH formats. To keep the number of blind decodes for the base transmission bandwidth 602 and the extended transmission bandwidth 616 the same as the number performed by legacy UEs that monitor only the control region in the base transmission bandwidth 602, non-legacy UEs may be configured to perform only a subset of blind decodings (e.g., ½) on each search space. This feature may be configured by RRC signaling. For example, instead of performing 6+6+2+2 blind decodes in a single control region, a non-legacy UE may perform 3+3+1+1 blind decodes in the control region of the base carrier 602 and 3+3+1+1 blind decodes in the control region of the extension carrier 609. The number of candidates is explained infra.

In LTE Rel-8, each UE may monitor both a common search space and a UE-specific search space in a control region. A search space may comprise a set of CCE locations where a UE may find its PDCCHs. One or more CCEs are used to transmit each PDCCH. All UEs are aware of the common search space, while the dedicated search space is configured for an individual UE. The maximum number of PDCCH candidates that a UE may attempt to decode in a subframe is listed in Table 1. The PDCCH candidates are transmitted using a number of the CCEs. Nine sets of four physical resource elements (REs) known as resource element groups (REGs) make up each CCE. Thus, one CCE equals 36 REs. The number of CCEs used for a PDCCH candidate may be 1, 2, 4, or 8. The number of CCEs used for a PDCCH candidate may also be referred to as an aggregation level. Each search space comprises a group of consecutive CCEs which could be allocated to a PDCCH called a PDCCH candidate. The CCE aggregation level determines the number of PDCCH candidates in a search space and is given by the PDCCH format. Table 1 gives the number of candidates and size of the search space for each aggregation level and the number of candidates.

TABLE 1

Search Space

| TYPE | Aggregation Level | Size in CCEs of entire Search Space | Number of PDCCH Candidates |
| --- | --- | --- | --- |
| UE-Specific | 1 | 6 | 6 |
| UE-Specific | 2 | 12 | 6 |
| UE-Specific | 4 | 8 | 2 |
| UE-Specific | 8 | 16 | 2 |
| Common | 4 | 16 | 4 |
| Common | 8 | 16 | 2 |

It can be observed in Table 1 that that there may be up to six PDCCH candidates in the common search space (i.e., four for CCE aggregation level 4, and two for aggregation level 8), and up to 16 candidates in the UE-specific search space (i.e., six for aggregation level 1, six for aggregation level 2, two for aggregation level 4, and two for aggregation level 8). It can be observed from Table 1 that a number of CCEs to be searched within each PDCCH candidate of a plurality of PDCCH candidates may depend on the aggregation level. Thus, there are 4 PDCCH candidates for common aggregation level 4 and 2 PDCCH candidates for common aggregation level 8 even though both are 16 CCEs in size. To find its PDCCH, the UE monitors a set of PDCCH candidates in every subframe. Now, going back to the example above, 6+6+2+2 PDCCH candidates on a single control region represents the total number of PDCCH candidates for the UE-specific search space that needs to be decoded, i.e., six for aggregation level 1, six for aggregation level 2, two for aggregation level 4, and two for aggregation level 8. By splitting the control region into two, one in the base transmission bandwidth 602 and the other in the extended transmission bandwidth, only half the number of PDCCH candidates, 3+3+1+1, needs to be decoded in each control region.

Figure 12:
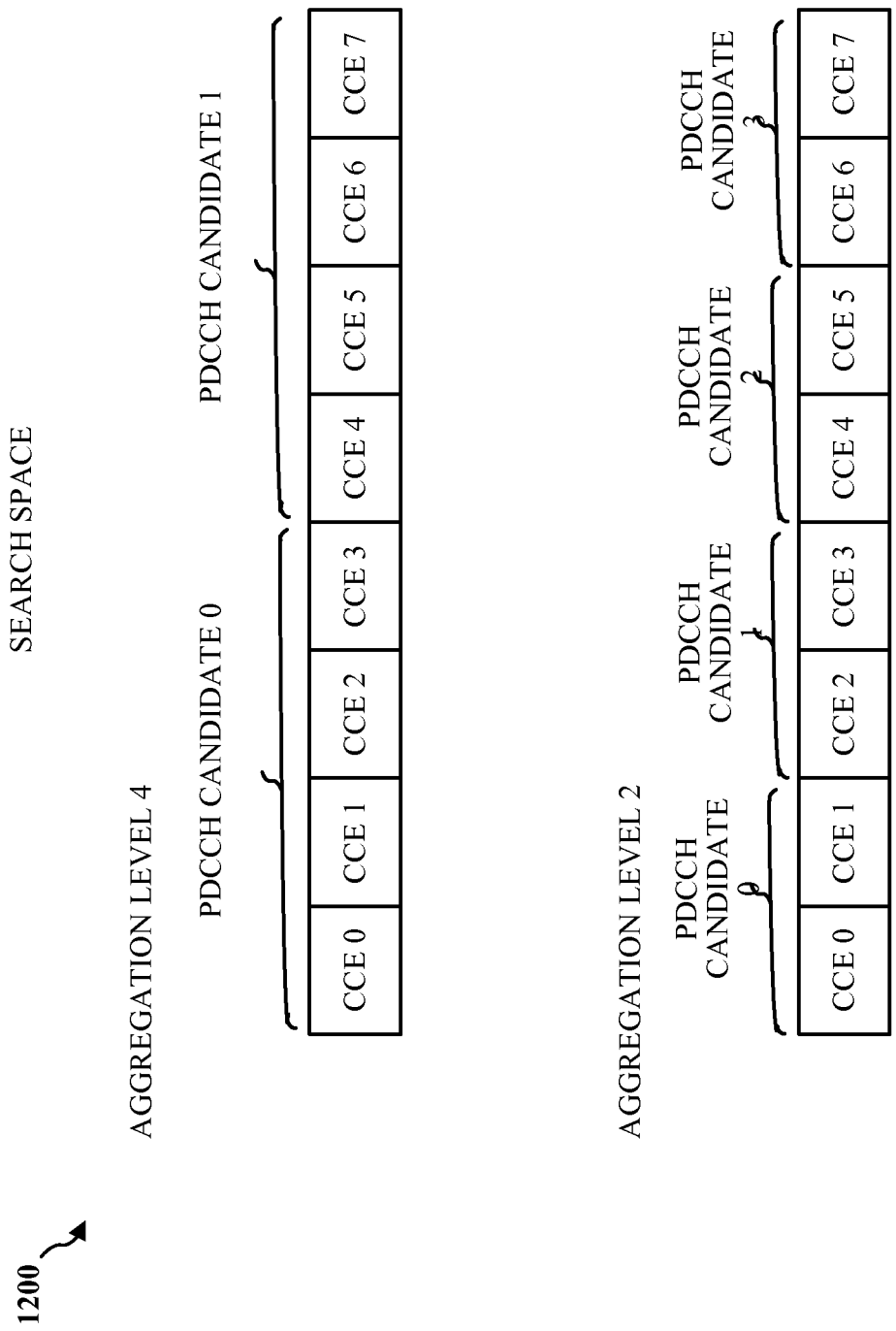
FIG. 12 is a diagram for illustrating a control region search space.

FIG. 12 is a diagram 1200 for illustrating a control region search space in which the PDCCH region has candidates of two aggregation levels, L=2 and L=4. For PDCCH format 2, the aggregation level is 4, and thus the PDCCH is transmitted in four CCEs. For PDCCH format 1, the aggregation level is 2, and thus the PDCCH is transmitted in two CCEs. A particular UE may need to check various CCE locations with different PDCCH formats in order to obtain its control information. Assume the entire search space includes 8 CCEs, a particular UE may need to blind decode PDCCH candidates 0, 1 for PDCCH format 2, and PDCCH candidates 0, 1, 2, 3 for PDCCH format 1 in order to obtain its control information.

The efficiency of the control region in the extension carrier 609 provides an improvement over a Rel-8 stand-alone 6 RB carrier, as the control region in the extension carrier 609 can be used only as a supplemental resource for dynamic/semi-persistent scheduling (SPS) scheduling. In addition, there is minimal loss due to insufficient control resources. For the option with independent control regions in the base carrier 602 and extension carrier 609, there may be no PHICH and PCFICH resources in the control region of the extension carrier 609. In such a configuration, a UE may rely on the PHICH and PCFICH provided on the base carrier 602 in the same subframe. Rather than rely on the PCFICH on the base carrier 602 to ascertain the control region size of the extension carrier 609, a non-legacy UE may receive the control region size of the extension carrier 609 through RRC signaling.

CCE Partitioning

Figure 13:
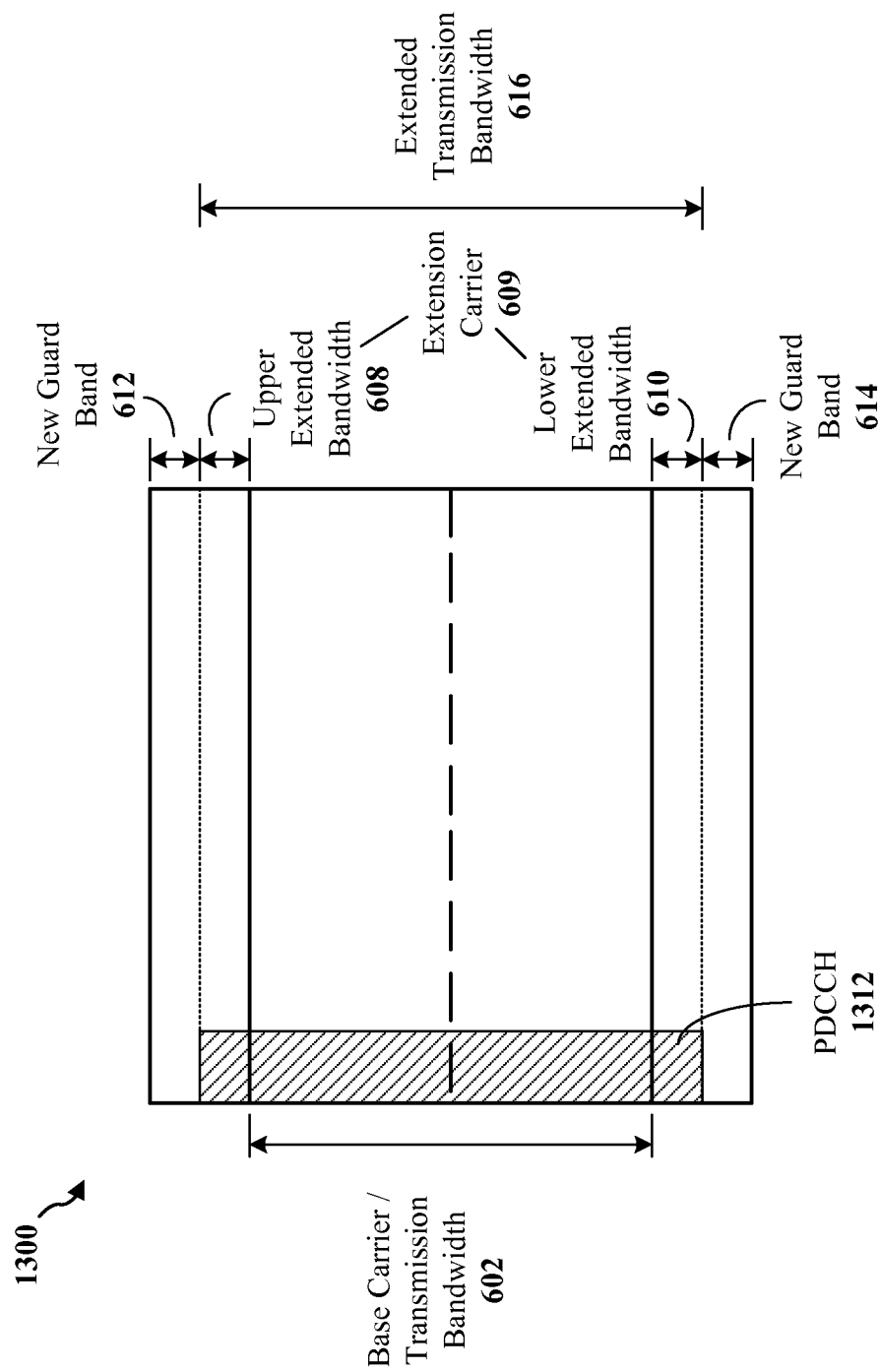
FIG. 13 is a first diagram for illustrating one control region with control channel element (CCE) partitioning within the context of an extended bandwidth.

FIG. 13 is a first diagram 1300 for illustrating one control region with CCE partitioning within the context of an extended bandwidth. As shown in FIG. 13, there may be one PDCCH 1312 for all subframes, and thus control channels spanning the base carrier 602 and the extension carrier 609 may be multiplexed together in the same subframe. In such a configuration, a pool of CCEs for the base carrier 602 and the extension carrier 609 may be defined. A legacy pool (base set) may include CCEs that are located within the base carrier 602 for both legacy and non-legacy UEs and a non-legacy pool (extended set) may include CCEs that are located within the extension carrier 609 for non-legacy UEs.

Figure 14:
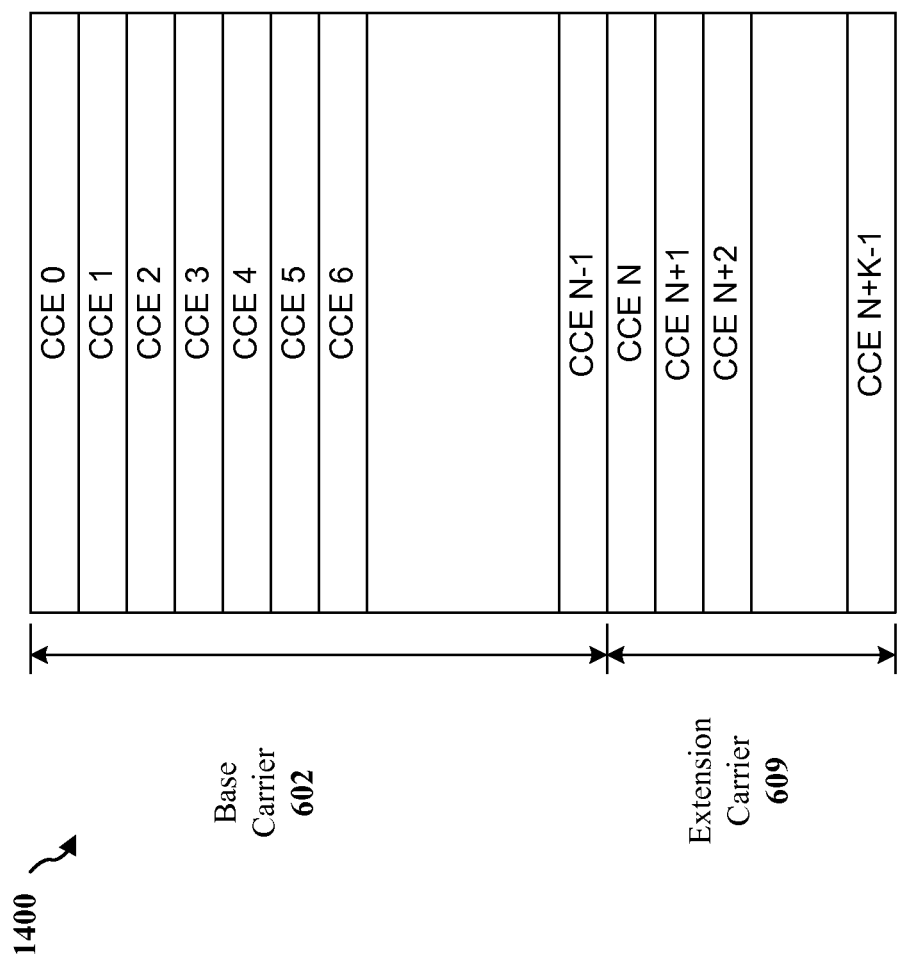
FIG. 14 is a second diagram for illustrating one control region with CCE partitioning within the context of an extended bandwidth.

FIG. 14 is a second diagram 1400 for illustrating one control region with CCE partitioning within the context of an extended bandwidth. The base set of CCEs within the base carrier 602 may be numbered 0, 1, 2, . . . , N−1, and the extended set of CCEs within the extension carrier 609 may be numbered N, N+1, . . . , N+K−1. For the PDCCH to CCE mapping, legacy UEs may use only the CCEs from the base set for the base carrier 602, and non-legacy UEs may use the CCEs from both the base set for the base carrier 602 and the extended set for the extension carrier 609. For example, the PDCCH of a non-legacy UE may be mapped on CCEs 0, 1, N, N+1, where the first two belong to the base set for the base carrier 602, and the second two belong to the extended set for the extension carrier 609. This feature expands the PDCCH space over the extended transmission bandwidth 616 and can provide more scheduling flexibility and PDCCH diversity. Load balancing can be taken into account, e.g., non-legacy UEs may be offloaded to the extended control and make more room for legacy UEs in the legacy control. In addition, a tree structure can be preserved on each control space.

The mapping of REGs to one of the base set of CCEs or the extended set of CCEs is separate due to interleaving. The PCFICH and the PHICH may be mapped only onto the CCEs of the base set for the base carrier 602. The control region size may be the same for both the base carrier 602 and the extension carrier 609.

Uplink Operation

Figure 15:
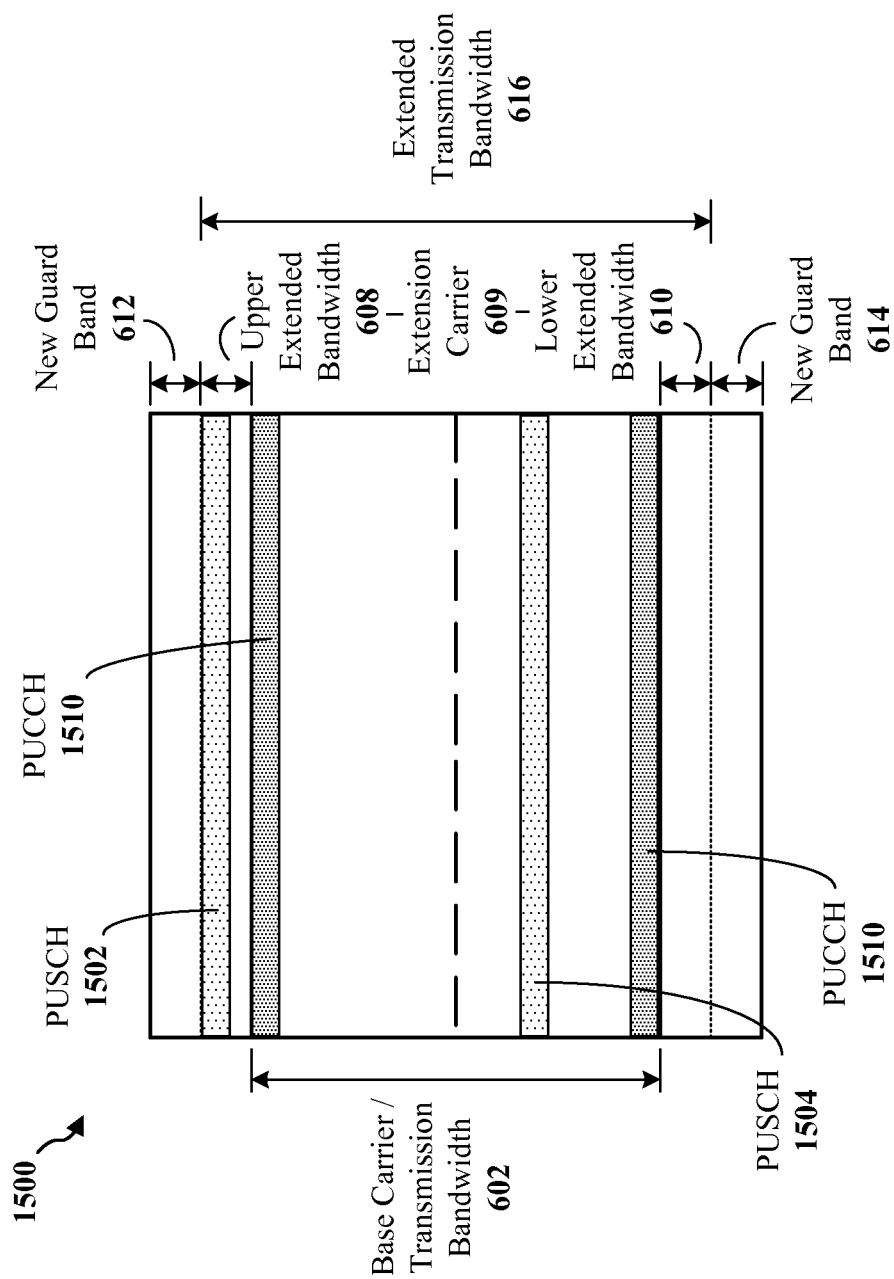
FIG. 15 is a diagram illustrating use of the extension carrier for a physical uplink shared channel (PUSCH).

FIG. 15 is a diagram 1500 illustrating use of the extension carrier for PUSCH. As shown in FIG. 15, the extended bandwidth is appended after the PUCCH region 1510. The extended bandwidth can be used for the PUSCH 1502 of semi-statically configured PUCCH resources for non-legacy UEs. Some scheduling restrictions may be imposed. For example, Rel-10 supports up to two cluster assignment on the UL. This is not an issue due to multiuser diversity. Thus, the PUSCH does not need to be contiguous or on a single carrier. As such, for a two cluster assignment on UL, a non-legacy UE may transmit the PUSCH 1502 and the PUSCH 1504. However, a narrow-band PUSCH transmission is more likely than multi-clustered PUSCH transmission due to emission mask problems with the latter, and therefore a non-legacy UE may transmit on the PUSCH 1502 or the PUSCH 1504, but not both. Because there is greater interference on the edges of the extended transmission bandwidth 616, eNBs may schedule non-legacy UEs with high path loss in the base carrier 602, such as in the PUSCH 1504, and non-legacy UEs with low path loss in the extension carrier 609, such as in the PUSCH 1502.

Figure 16:
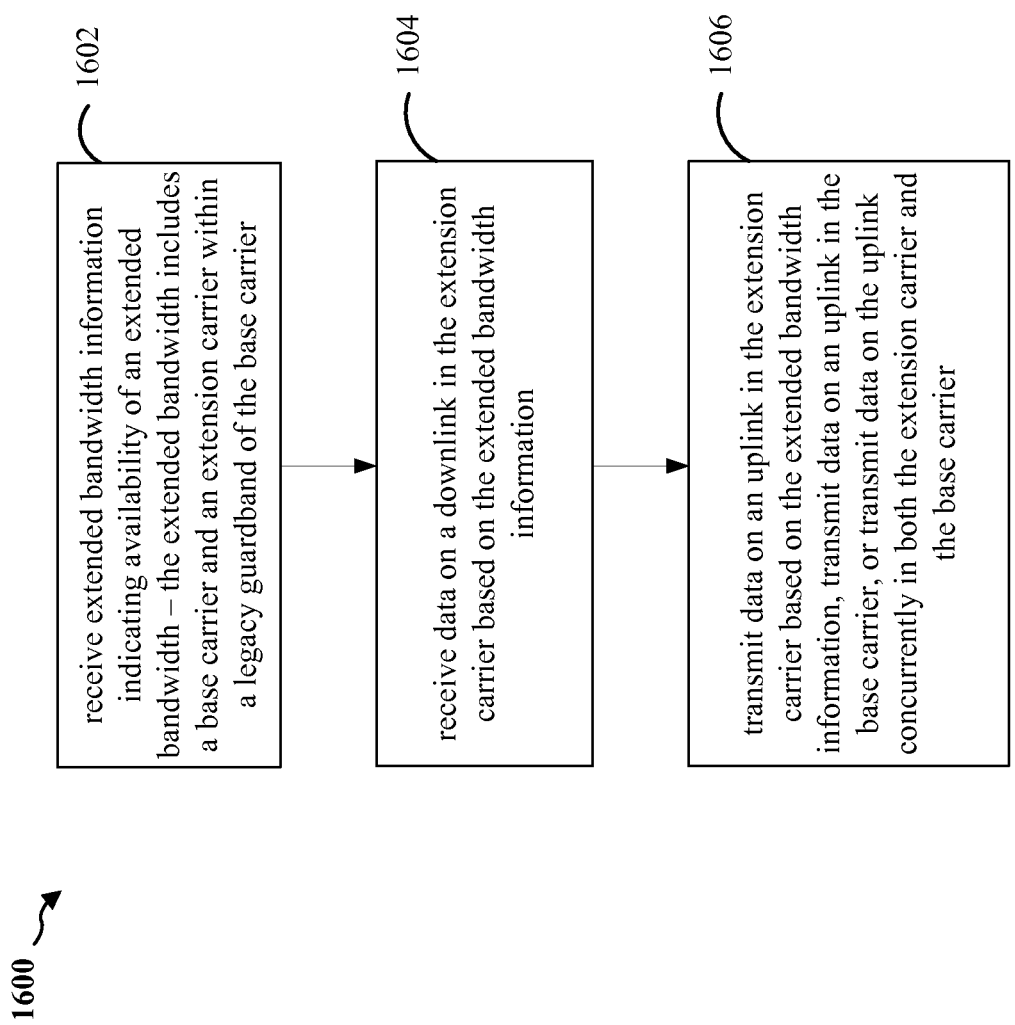
FIG. 16 is a flow chart of a method of wireless communication.

FIG. 16 is a flow chart 1600 of a method of wireless communication. The method is performed by a UE. In step 1602, the UE receives extended bandwidth information indicating availability of an extended bandwidth. The extended bandwidth includes a base carrier and an extension carrier within a legacy guard band of the base carrier. In step 1604, the UE receives data on a downlink in the extension carrier based on the extended bandwidth information. In step 1606, the UE transmits data on an uplink in the extension carrier based on the extended bandwidth information, transmits data on the uplink in the base carrier, or transmits data concurrently on the uplink in both the base and extension carriers.

In one configuration, the extended bandwidth includes a base bandwidth of the base carrier, an upper extended bandwidth in an upper legacy guard band of the base carrier, and a lower extended bandwidth in a lower legacy guard band of the base carrier. The upper extended bandwidth and the lower extended bandwidth have an equal size. In one configuration, the extended bandwidth information is received through RRC signaling.

Figure 17:
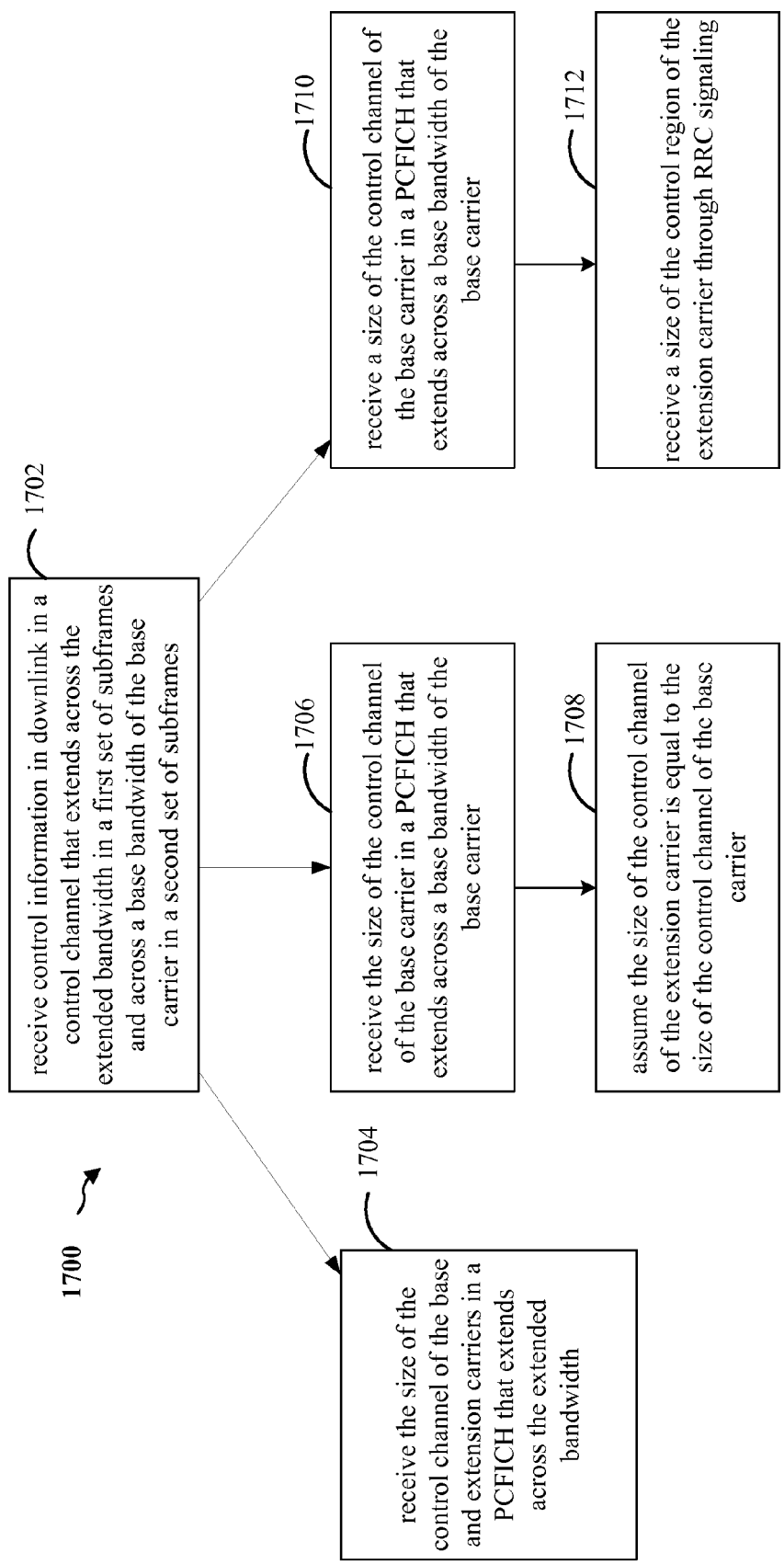
FIG. 17 is a first flow chart of a method of wireless communication within the context of TDM partitioning.

FIG. 17 is a first flow chart 1700 of a method of wireless communication within the context of TDM partitioning. The method may be performed by a UE. In step 1702, the UE receives control information in downlink in a control channel that extends across the extended bandwidth in a first set of subframes (e.g., type A subframes of FIG. 10) and across a base bandwidth of the base carrier in a second set of subframes (e.g., type B subframes of FIG. 10). In one configuration, the first set of subframes are utilized by UEs supporting non-legacy operation (i.e., non-legacy UEs) and the second set of subframes are utilized UEs supporting legacy operation (i.e., both non-legacy UEs and legacy UEs). In one configuration, a size (i.e., number of OFDM symbols) of the control channel within the extension carrier is equal to a size (i.e., number of OFDM symbols) of the control channel within the base carrier. In a first configuration, in step 1704, the UE may receive the size of the control channel of the base and extension carriers in a PCFICH that extends across the extended bandwidth. In a second configuration, in step 1706, the UE may receive the size of the control channel of the base carrier in a PCFICH that extends across a base bandwidth of the base carrier. In such a configuration, in step 1708, the UE assumes the size of the control channel of the extension carrier is equal to the size of the control channel of the base carrier. In a third configuration, in step 1710, the UE may receive a size of the control channel of the base carrier in a PCFICH that extends across a base bandwidth of the base carrier. In such a configuration, in step 1712, the UE receives a size of the control region of the extension carrier through RRC signaling.

Figure 18:
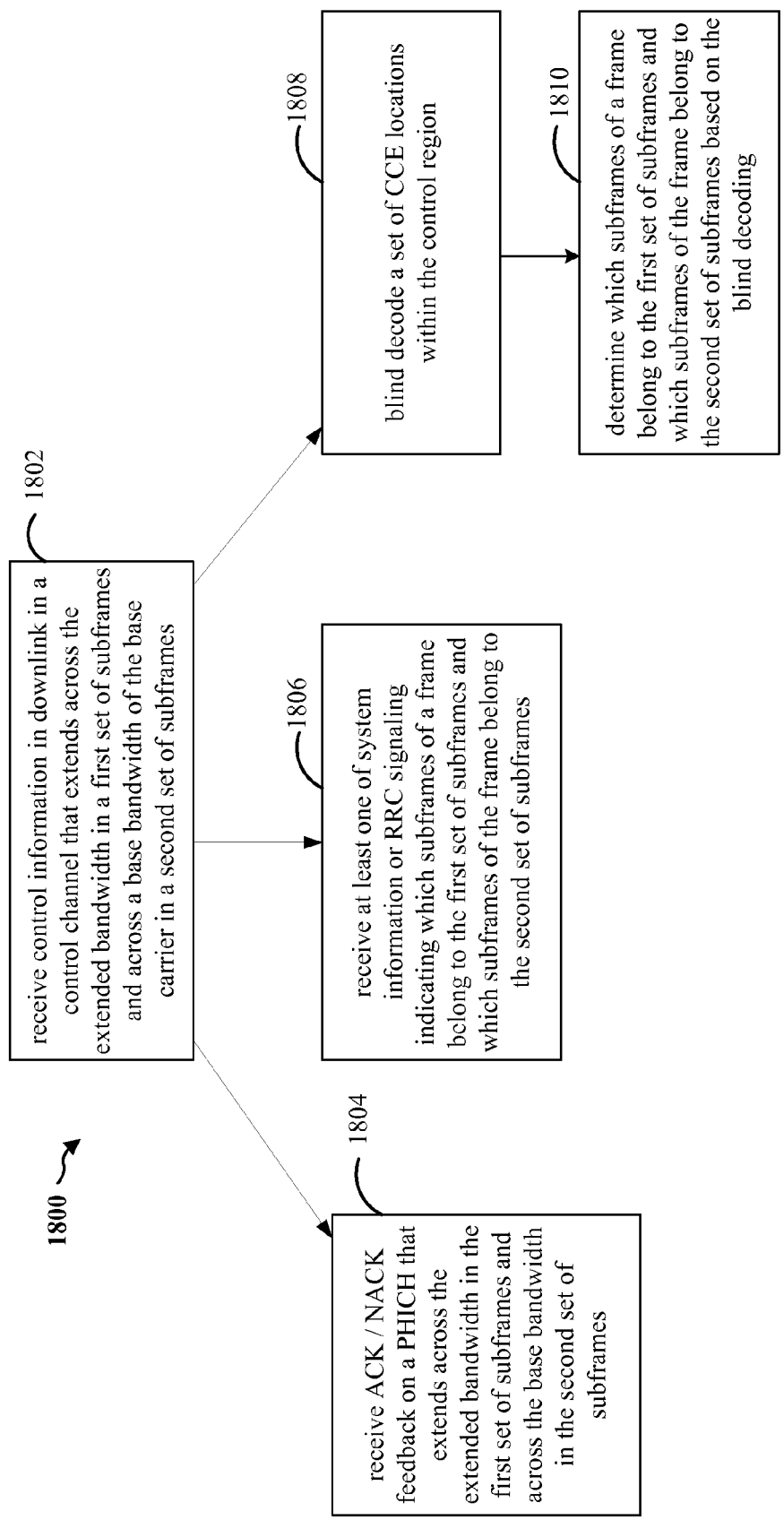
FIG. 18 is a second flow chart of a method of wireless communication within the context of TDM partitioning.

FIG. 18 is a second flow chart 1800 of a method of wireless communication within the context of TDM partitioning. The method may be performed by a UE. In step 1802, the UE receives control information in downlink in a control channel that extends across the extended bandwidth in a first set of subframes and across a base bandwidth of the base carrier in a second set of subframes. In step 1804, the UE may receive ACK/NACK feedback on a PHICH that extends across the extended bandwidth in the first set of subframes and across the base bandwidth in the second set of subframes. In step 1806, the UE may receive at least one of SI or RRC signaling indicating which subframes of a frame belong to the first set of subframes and which subframes of the frame belong to the second set of subframes. In step 1808, the UE may blind decode a set of CCE locations within the control region, and in step 1810, determine which subframes of a frame belong to the first set of subframes and which subframes of the frame belong to the second set of subframes based on the blind decoding.

Figure 19:
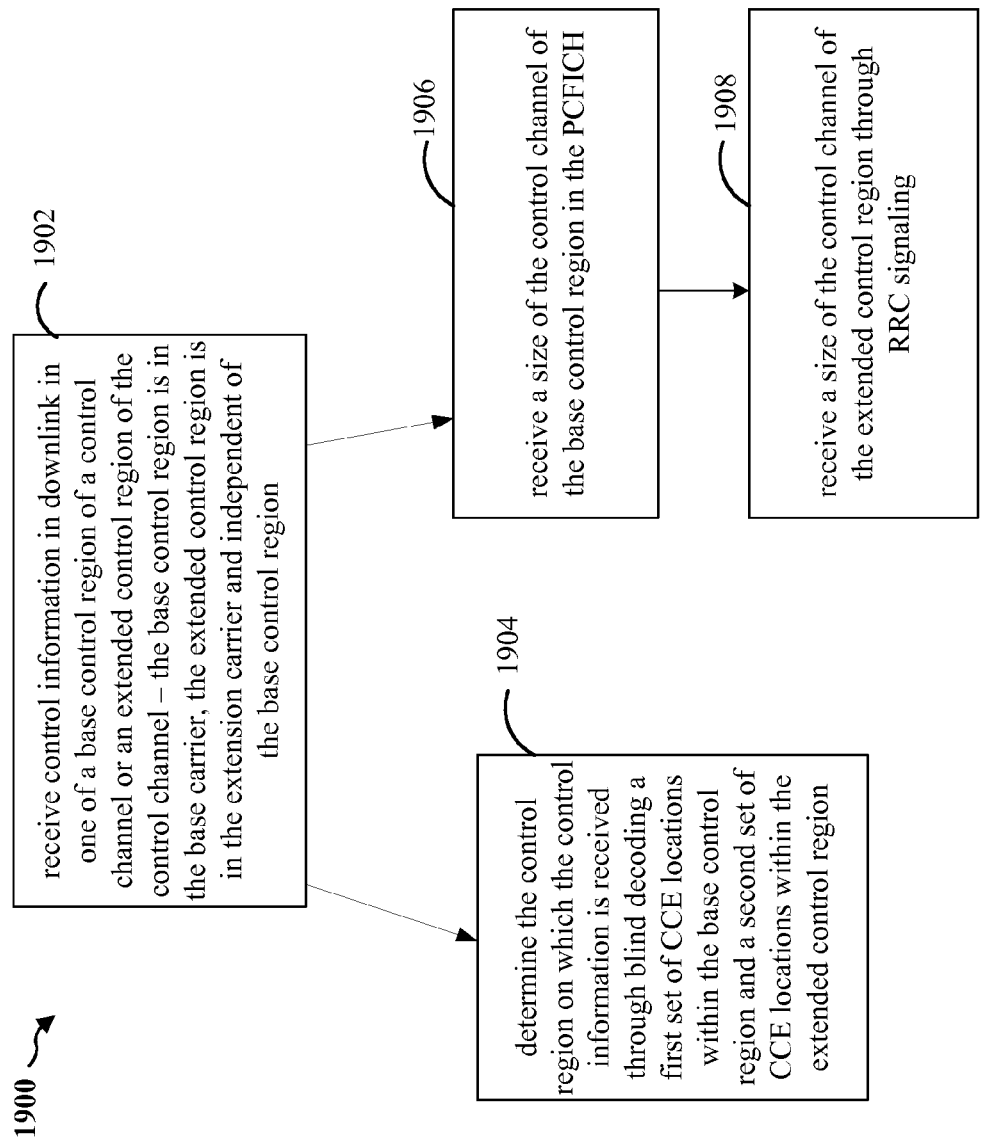
FIG. 19 is a flow chart of a method of wireless communication within the context of defined independent control channels.

FIG. 19 is a flow chart 1900 of a method of wireless communication within the context of defined independent control channels. The method may be performed by a UE. In step 1902, the UE receives control information in downlink in one of a base control region of a control channel or an extended control region of the control channel. The base control region is in the base carrier. The extended control region is in the extension carrier and independent of the base control region. In step 1904, the UE may determine the control region on which the control information is received through blind decoding a first set of CCE locations within the base control region and a second set of CCE locations within the extended control region. In one configuration, a PHICH is received only in the base control region of the control channel. In one configuration, a PCFICH is received only in the base control region of the control channel. In step 1906, the UE may receive a size of the control channel of the base control region in the PCFICH, and in step 1908, the UE may receive a size of the control channel of the extended control region through RRC signaling.

Figure 20:
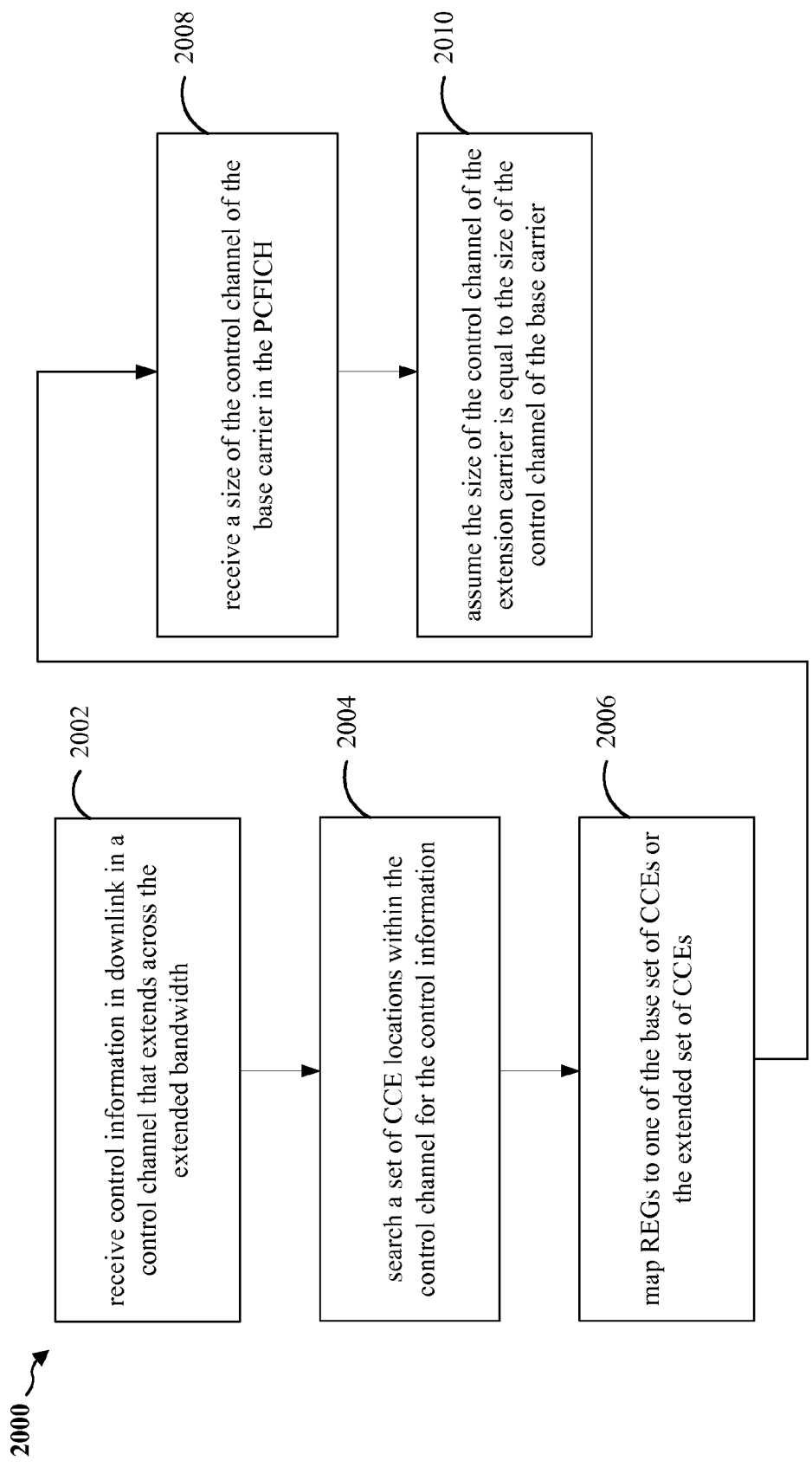
FIG. 20 is a flow chart of a method of wireless communication within the context of a common control channel with CCE partitioning.

FIG. 20 is a flow chart 2000 of a method of wireless communication within the context of a common control channel with CCE partitioning. The method may be performed by a UE. N step 2002, the UE receives control information in downlink in a control channel that extends across the extended bandwidth. In step 2004, the UE searches a set of CCE locations within the control channel for the control information. In such a configuration, the set of CCE locations are within a plurality of CCEs including a base set of CCEs and an extended set of CCEs. The base set of CCEs and the extended set of CCEs are for UEs supporting non-legacy operation and the base set of CCEs is for UEs supporting legacy operation. In step 2006, the UE may map REGs to one of the base set of CCEs or the extended set of CCEs. In one configuration, a PHICH is received only in the base set of CCEs. In one configuration, a PCFICH is received only in the base set of CCEs. In step 2008, the UE may receive a size of the control channel of the base carrier in the PCFICH, and in step 2010, the UE may assume the size of the control channel of the extension carrier is equal to the size of the control channel of the base carrier.

Figure 21:
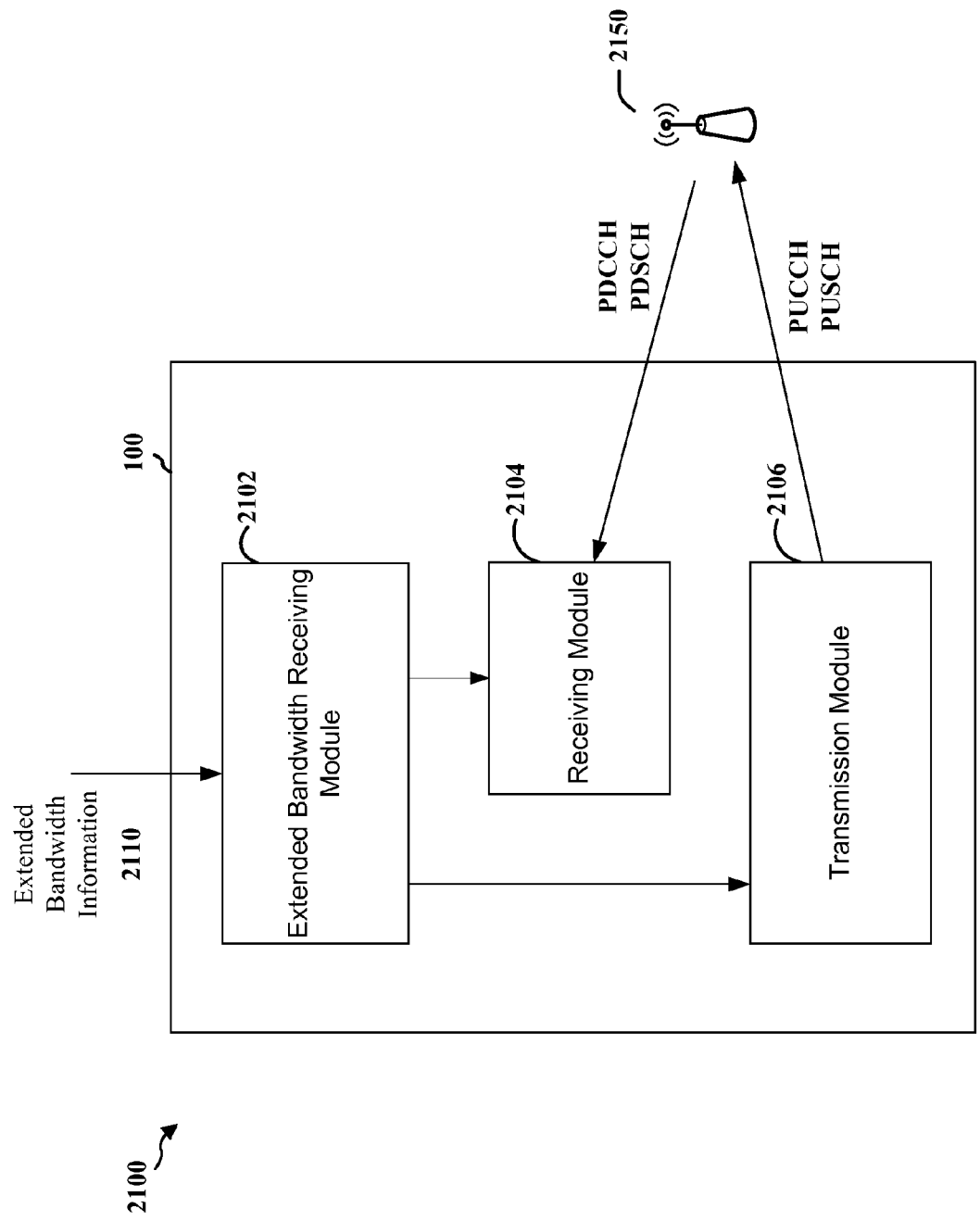
FIG. 21 is a conceptual data flow diagram illustrating the data flow between different modules/means/components in an exemplary apparatus.

FIG. 21 is a conceptual data flow diagram 2100 illustrating the data flow between different modules/means/components in an exemplary apparatus 100. The apparatus 100 includes an extended bandwidth receiving module 2102 configured to receive extended bandwidth information 2110 indicating availability of an extended bandwidth. The extended bandwidth includes a base carrier and an extension carrier within a legacy guard band of the base carrier. The apparatus 100 further includes a receiving module 2104 configured to receive data on a downlink in the extension carrier based on the extended bandwidth information 2110. The apparatus 100 further includes a transmission module 2106 that is configured to transmit data on an uplink in the extension carrier to the eNB 2150 based on the extended bandwidth information 2110, to transmit data on the uplink on the base carrier to the eNB 2150, and/or to transmit data on the uplink concurrently on both the base and extension carriers to the eNB 2150.

The apparatus may include additional modules that perform each of the steps of the algorithm in the aforementioned flow charts, including FIGS. 16-20. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 22:
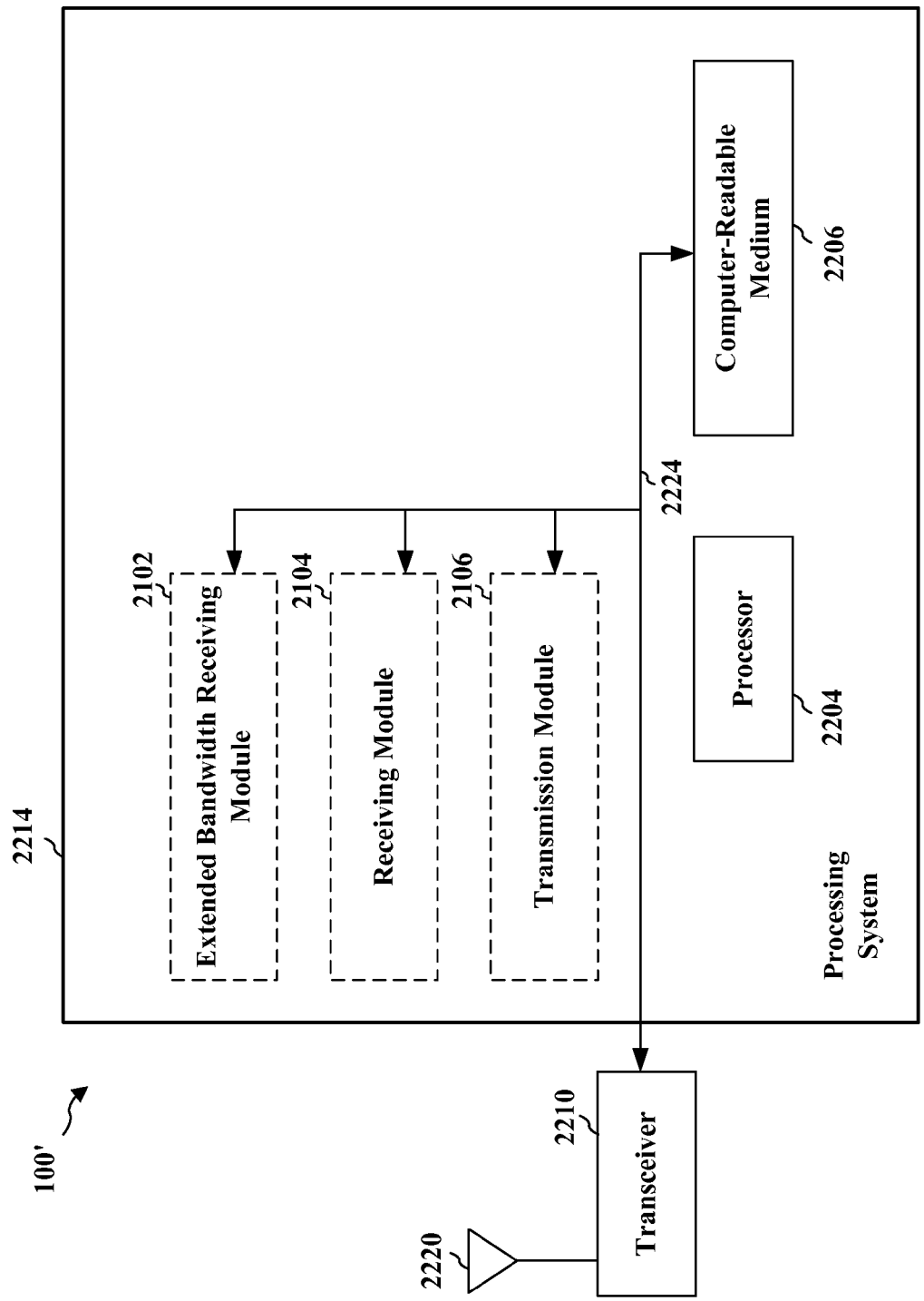
FIG. 22 is a diagram illustrating an example of a hardware implementation for an apparatus employing a processing system.

FIG. 22 is a diagram illustrating an example of a hardware implementation for an apparatus 100' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2102, 2104, 2106 and the computer-readable medium 2206. The bus 2224 may also link various other circuits such as timing sources, peripherals, voltage regulators, and power management circuits, which are well known in the art, and therefore, will not be described any further.

The apparatus includes a processing system 2214 coupled to a transceiver 2210. The transceiver 2210 is coupled to one or more antennas 2220. The transceiver 2210 provides a means for communicating with various other apparatus over a transmission medium. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes modules 2102, 2104, 2106. The modules may be software modules running in the processor 2204, resident/stored in the computer readable medium 2206, one or more hardware modules coupled to the processor 2204, or some combination thereof. The processing system 2214 may be a component of the UE 120 and may include the memory 382 and/or at least one of the TX processor 364, the RX processor 358, and the controller/processor 380.

In one configuration, the apparatus 100/100' for wireless communication includes means for receiving extended bandwidth information indicating availability of an extended bandwidth. The extended bandwidth includes a base carrier and an extension carrier within a legacy guard band of the base carrier. The apparatus further includes means for receiving data on a downlink in the extension carrier based on the extended bandwidth information. The apparatus may further include means for transmitting data on an uplink in the extension carrier based on the extended bandwidth information. The apparatus may further include means for receiving control information in downlink in a control channel that extends across the extended bandwidth in a first set of subframes and across a base bandwidth of the base carrier in a second set of subframes. The apparatus may further include means for receiving the size of the control channel of the base and extension carriers in a PCFICH that extends across the extended bandwidth. The apparatus may further include means for receiving the size of the control channel of the base carrier in a PCFICH that extends across a base bandwidth of the base carrier, and means for assuming the size of the control channel of the extension carrier is equal to the size of the control channel of the base carrier. The apparatus may further include means for receiving a size of the control channel of the base carrier in a PCFICH that extends across a base bandwidth of the base carrier, and means for receiving a size of the control region of the extension carrier through RRC signaling. The apparatus may further include means for receiving ACK/NACK feedback on a PHICH that extends across the extended bandwidth in the first set of subframes and across the base bandwidth in the second set of subframes. The apparatus may further include means for receiving at least one of SI or RRC signaling indicating which subframes of a frame belong to the first set of subframes and which subframes of the frame belong to the second set of subframes. The apparatus may further include means for blind decoding a set of CCE locations within the control region, and means for determining which subframes of a frame belong to the first set of subframes and which subframes of the frame belong to the second set of subframes based on the blind decoding. The apparatus may further include means for receiving control information in downlink in one of a base control region of a control channel or an extended control region of the control channel. The base control region is in the base carrier. The extended control region is in the extension carrier and independent of the base control region. The apparatus may further include means for determining the control region on which the control information is received through blind decoding a first set of CCE locations within the base control region and a second set of CCE locations within the extended control region. The apparatus may further include means for receiving a size of the control channel of the base control region in the PCFICH, and means for receiving a size of the control channel of the extended control region through RRC signaling. The apparatus may further include means for receiving control information in downlink in a control channel that extends across the extended bandwidth, and means for searching a set of CCE locations within the control channel for the control information. In such a configuration, the set of CCE locations are within a plurality of CCEs including a base set of CCEs and an extended set of CCEs, the base set of CCEs and the extended set of CCEs are for UEs supporting non-legacy operation, and the base set of CCEs is for UEs supporting legacy operation. The apparatus may further include means for mapping REGs to one of the base set of CCEs or the extended set of CCEs. The apparatus may further include means for receiving a size of the control channel of the base carrier in the PCFICH, and means for assuming the size of the control channel of the extension carrier is equal to the size of the control channel of the base carrier. The apparatus may further include means for transmitting data on an uplink on the base carrier. The apparatus may further include means for transmitting data on the uplink in the extension carrier concurrently with the transmission of the data on the uplink in the base carrier. The aforementioned means may be one or more of the aforementioned modules of the apparatus 100 and/or the processing system 2214 of the apparatus 100' configured to perform the functions recited by the aforementioned means. As described supra, the processing system 2214 may include the TX Processor 364, the RX Processor 358, and the controller/processor 380. As such, in one configuration, the aforementioned means may be the TX Processor 364, the RX Processor 358, and the controller/processor 380 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving extended bandwidth information indicating availability of an extended bandwidth, the extended bandwidth including a base carrier and an extension carrier within a legacy guard band of the base carrier; and
   receiving data on a downlink in the extension carrier within the legacy guard band of the base carrier based on the extended bandwidth information, wherein the downlink is operated within a legacy composite bandwidth, wherein the extension carrier is operated within the extended bandwidth, wherein the extended bandwidth is within the legacy composite bandwidth, and wherein the extended bandwidth comprises a base bandwidth of the base carrier, an upper extended bandwidth in an upper legacy guard band of the base carrier, and a lower extended bandwidth in a lower legacy guard band of the base carrier; and receiving control information on the downlink in a control channel that extends (a) across the extended bandwidth into the extension carrier in a first set of subframes and (b) across and within the base bandwidth of the base carrier in a second set of subframes.

2. The method of claim 1, wherein the upper extended bandwidth and the lower extended bandwidth have an equal size.

3. The method of claim 1, wherein the extended bandwidth information is received through radio resource control (RRC) signaling.

4. The method of claim 1, further comprising transmitting data on an uplink in the extension carrier based on the extended bandwidth information.

5. The method of claim 1, wherein the first set of subframes are utilized by user equipments (UEs) that support non-legacy operation and the second set of subframes are utilized by UEs that support legacy operation.

6. The method of claim 1, wherein a size of the control channel within the extension carrier is equal to a size of the control channel within the base carrier.

7. The method of claim 6, further comprising receiving the size of the control channel of the base and extension carriers in a physical control format indicator channel (PCFICH) that extends across the extended bandwidth.

8. The method of claim 6, further comprising:
receiving the size of the control channel of the base carrier in a physical control format indicator channel (PCFICH) that extends across a base bandwidth of the base carrier; and
assuming the size of the control channel of the extension carrier is equal to the size of the control channel of the base carrier.

9. The method of claim 1, further comprising:
receiving a size of the control channel of the base carrier in a physical control format indicator channel (PCFICH) that extends across a base bandwidth of the base carrier; and
receiving a size of the control region of the extension carrier through radio resource control (RRC) signaling.

10. The method of claim 1, further comprising receiving acknowledgment (ACK)/negative acknowledgement (NACK) feedback on a physical hybrid automatic repeat request indicator channel (PHICH) that extends across the extended bandwidth in the first set of subframes and across the base bandwidth in the second set of subframes.

11. The method of claim 1, further comprising receiving at least one of system information or radio resource control (RRC) signaling indicating which subframes of a frame belong to the first set of subframes and which subframes of the frame belong to the second set of subframes.

12. The method of claim 1, further comprising:
blind decoding a set of control channel element (CCE) locations within the control region; and
determining which subframes of a frame belong to the first set of subframes and which subframes of the frame belong to the second set of subframes based on the blind decoding.

13. The method of claim 1, further comprising receiving control information in downlink in one of a base control region of a control channel or an extended control region of the control channel, the base control region being in the base carrier, the extended control region being in the extension carrier and independent of the base control region.

14. The method of claim 13, further comprising determining the control region on which the control information is received through blind decoding a first set of control channel element (CCE) locations within the base control region and a second set of CCE locations within the extended control region.

15. The method of claim 13, wherein a physical hybrid automatic repeat request indicator channel (PHICH) is received only in the base control region of the control channel.

16. The method of claim 13, wherein a physical control format indicator channel (PCFICH) is received only in the base control region of the control channel.

17. The method of claim 16, further comprising:
receiving a size of the control channel of the base control region in the PCFICH; and
receiving a size of the control channel of the extended control region through radio resource control (RRC) signaling.

18. The method of claim 1, further comprising:
receiving control information in downlink in a control channel that extends across the extended bandwidth; and
searching a set of control channel element (CCE) locations within the control channel for the control information,
wherein the set of CCE locations are within a plurality of CCEs including a base set of CCEs and an extended set of CCEs, the base set of CCEs and the extended set of CCEs being for user equipments (UEs) supporting non-legacy operation, the base set of CCEs being for UEs supporting legacy operation.

19. The method of claim 18, further comprising mapping resource element groups (REGs) to one of the base set of CCEs or the extended set of CCEs.

20. The method of claim 18, wherein a physical hybrid automatic repeat request indicator channel (PHICH) is received only in the base set of CCEs.

21. The method of claim 18, wherein a physical control format indicator channel (PCFICH) is received only in the base set of CCEs.

22. The method of claim 21, further comprising:
receiving a size of the control channel of the base carrier in the PCFICH; and
assuming the size of the control channel of the extension carrier is equal to the size of the control channel of the base carrier.

23. The method of claim 1, further comprising transmitting data on an uplink on the base carrier.

24. The method of claim 23, further comprising transmitting data on the uplink in the extension carrier concurrently with the transmission of the data on the uplink in the base carrier.

25. An apparatus for wireless communication, comprising:
means for receiving extended bandwidth information indicating availability of an extended bandwidth, the extended bandwidth including a base carrier and an extension carrier within a legacy guard band of the base carrier;
means for receiving data on a downlink in the extension carrier within the legacy guard band of the base carrier based on the extended bandwidth information, wherein the downlink operates within a legacy composite bandwidth, wherein the extension carrier is operated within the extended bandwidth, wherein the extended bandwidth is within the legacy composite bandwidth, and wherein the extended bandwidth comprises a base bandwidth of the base carrier, an upper extended bandwidth in an upper legacy guard band of the base carrier, and a lower extended bandwidth in a lower legacy guard band of the base carrier; and means for receiving control information on the downlink in a control channel that extends (a) across the extended bandwidth into the extension carrier in a first set of subframes and (b) across and within the base bandwidth of the base carrier in a second set of subframes.

26. The apparatus of claim 25, wherein the upper extended bandwidth and the lower extended bandwidth have an equal size.

27. The apparatus of claim 25, wherein the extended bandwidth information is received through radio resource control (RRC) signaling.

28. The apparatus of claim 25, further comprising means for transmitting data on an uplink in the extension carrier based on the extended bandwidth information.

29. The apparatus of claim 25, wherein the first set of subframes are utilized by user equipments (UEs) that support non-legacy operation and the second set of subframes are utilized by UEs that support legacy operation.

30. The apparatus of claim 25, wherein a size of the control channel within the extension carrier is equal to a size of the control channel within the base carrier.

31. The apparatus of claim 30, further comprising means for receiving the size of the control channel of the base and extension carriers in a physical control format indicator channel (PCFICH) that extends across the extended bandwidth.

32. The apparatus of claim 30, further comprising:
means for receiving the size of the control channel of the base carrier in a physical control format indicator channel (PCFICH) that extends across a base bandwidth of the base carrier; and
means for assuming the size of the control channel of the extension carrier is equal to the size of the control channel of the base carrier.

33. The apparatus of claim 25, further comprising:
means for receiving a size of the control channel of the base carrier in a physical control format indicator channel (PCFICH) that extends across a base bandwidth of the base carrier; and
means for receiving a size of the control region of the extension carrier through radio resource control (RRC) signaling.

34. The apparatus of claim 25, further comprising means for receiving acknowledgment (ACK)/negative acknowledgement (NACK) feedback on a physical hybrid automatic repeat request indicator channel (PHICH) that extends across the extended bandwidth in the first set of subframes and across the base bandwidth in the second set of subframes.

35. The apparatus of claim 25, further comprising means for receiving at least one of system information or radio resource control (RRC) signaling indicating which subframes of a frame belong to the first set of subframes and which subframes of the frame belong to the second set of subframes.

36. The apparatus of claim 25, further comprising:
means for blind decoding a set of control channel element (CCE) locations within the control region; and
means for determining which subframes of a frame belong to the first set of subframes and which subframes of the frame belong to the second set of subframes based on the blind decoding.

37. The apparatus of claim 25, further comprising means for receiving control information in downlink in one of a base control region of a control channel or an extended control region of the control channel, the base control region being in the base carrier, the extended control region being in the extension carrier and independent of the base control region.

38. The apparatus of claim 37, further comprising means for determining the control region on which the control information is received through blind decoding a first set of control channel element (CCE) locations within the base control region and a second set of CCE locations within the extended control region.

39. The apparatus of claim 37, wherein a physical hybrid automatic repeat request indicator channel (PHICH) is received only in the base control region of the control channel.

40. The apparatus of claim 37, wherein a physical control format indicator channel (PCFICH) is received only in the base control region of the control channel.

41. The apparatus of claim 40, further comprising:
means for receiving a size of the control channel of the base control region in the PCFICH; and
means for receiving a size of the control channel of the extended control region through radio resource control (RRC) signaling.

42. The apparatus of claim 25, further comprising:
means for receiving control information in downlink in a control channel that extends across the extended bandwidth; and
means for searching a set of control channel element (CCE) locations within the control channel for the control information,
wherein the set of CCE locations are within a plurality of CCEs including a base set of CCEs and an extended set of CCEs, the base set of CCEs and the extended set of CCEs being for user equipments (UEs) supporting non-legacy operation, the base set of CCEs being for UEs supporting legacy operation.

43. The apparatus of claim 42, further comprising means for mapping resource element groups (REGs) to one of the base set of CCEs or the extended set of CCEs.

44. The apparatus of claim 42, wherein a physical hybrid automatic repeat request indicator channel (PHICH) is received only in the base set of CCEs.

45. The apparatus of claim 42, wherein a physical control format indicator channel (PCFICH) is received only in the base set of CCEs.

46. The apparatus of claim 45, further comprising:
means for receiving a size of the control channel of the base carrier in the PCFICH; and
means for assuming the size of the control channel of the extension carrier is equal to the size of the control channel of the base carrier.

47. The apparatus of claim 25, further comprising means for transmitting data on an uplink on the base carrier.

48. The apparatus of claim 27, further comprising means for transmitting data on the uplink in the extension carrier concurrently with the transmission of the data on the uplink in the base carrier.

49. An apparatus of wireless communication, comprising:
a memory; and
at least one processor coupled to the memory and configured to:
receive extended bandwidth information indicating availability of an extended bandwidth, the extended bandwidth including a base carrier and an extension carrier within a legacy guard band of the base carrier;
receive data on a downlink in the extension carrier within the legacy guard band of the base carrier based on the extended bandwidth information, wherein the downlink is operated within a legacy composite bandwidth, wherein the extension carrier is operated within the extended bandwidth, wherein the extended bandwidth is within the legacy composite bandwidth, and wherein the extended bandwidth comprises a base bandwidth of the base carrier, an upper extended bandwidth in an upper legacy guard band of the base carrier, and a lower extended bandwidth in a lower legacy guard band of the base carrier; and receive control information on the downlink in a control channel that extends (a) across the extended bandwidth into the extension carrier in a first set of subframes and (b) across and within the base bandwidth of the base carrier in a second set of subframes.

50. The apparatus of claim 49, wherein the upper extended bandwidth and the lower extended bandwidth have an equal size.

51. The apparatus of claim 49, wherein the extended bandwidth information is received through radio resource control (RRC) signaling.

52. The apparatus of claim 49, wherein the processor is further configured to transmit data on an uplink in the extension carrier based on the extended bandwidth information.

53. The apparatus of claim 49, wherein the first set of subframes are utilized by user equipments (UEs) that support non-legacy operation and the second set of subframes are utilized by UEs that support legacy operation.

54. The apparatus of claim 49, wherein a size of the control channel within the extension carrier is equal to a size of the control channel within the base carrier.

55. The apparatus of claim 54, wherein the processor is further configured to receive the size of the control channel of the base and extension carriers in a physical control format indicator channel (PCFICH) that extends across the extended bandwidth.

56. The apparatus of claim 54, wherein the processor is further configured to:
receive the size of the control channel of the base carrier in a physical control format indicator channel (PCFICH) that extends across a base bandwidth of the base carrier; and
assume the size of the control channel of the extension carrier is equal to the size of the control channel of the base carrier.

57. The apparatus of claim 49, wherein the processor is further configured to:
receive a size of the control channel of the base carrier in a physical control format indicator channel (PCFICH) that extends across a base bandwidth of the base carrier; and
receive a size of the control region of the extension carrier through radio resource control (RRC) signaling.

58. The apparatus of claim 49, wherein the processor is further configured to receive acknowledgment (ACK)/negative acknowledgement (NACK) feedback on a physical hybrid automatic repeat request indicator channel (PHICH) that extends across the extended bandwidth in the first set of subframes and across the base bandwidth in the second set of subframes.

59. The apparatus of claim 49, wherein the processor is further configured to receive at least one of system information or radio resource control (RRC) signaling indicating which subframes of a frame belong to the first set of subframes and which subframes of the frame belong to the second set of subframes.

60. The apparatus of claim 49, wherein the processor is further configured to:
blind decode a set of control channel element (CCE) locations within the control region; and
determine which subframes of a frame belong to the first set of subframes and which subframes of the frame belong to the second set of subframes based on the blind decoding.

61. The apparatus of claim 49, wherein the processor is further configured to receive control information in downlink in one of a base control region of a control channel or an extended control region of the control channel, the base control region being in the base carrier, the extended control region being in the extension carrier and independent of the base control region.

62. The apparatus of claim 61, wherein the processor is further configured to determine the control region on which the control information is received through blind decoding a first set of control channel element (CCE) locations within the base control region and a second set of CCE locations within the extended control region.

63. The apparatus of claim 61, wherein a physical hybrid automatic repeat request indicator channel (PHICH) is received only in the base control region of the control channel.

64. The apparatus of claim 61, wherein a physical control format indicator channel (PCFICH) is received only in the base control region of the control channel.

65. The apparatus of claim 64, wherein the processor is further configured to:
receive a size of the control channel of the base control region in the PCFICH; and
receive a size of the control channel of the extended control region through radio resource control (RRC) signaling.

66. The apparatus of claim 49, wherein the processor is further configured to:
receive control information in downlink in a control channel that extends across the extended bandwidth; and
search a set of control channel element (CCE) locations within the control channel for the control information,
wherein the set of CCE locations are within a plurality of CCEs including a base set of CCEs and an extended set of CCEs, the base set of CCEs and the extended set of CCEs being for user equipments (UEs) supporting non-legacy operation, the base set of CCEs being for UEs supporting legacy operation.

67. The apparatus of claim 66, wherein the processor is further configured to map resource element groups (REGs) to one of the base set of CCEs or the extended set of CCEs.

68. The apparatus of claim 66, wherein a physical hybrid automatic repeat request indicator channel (PHICH) is received only in the base set of CCEs.

69. The apparatus of claim 66, wherein a physical control format indicator channel (PCFICH) is received only in the base set of CCEs.

70. The apparatus of claim 69, wherein the processor is further configured to:
receive a size of the control channel of the base carrier in the PCFICH; and
assume the size of the control channel of the extension carrier is equal to the size of the control channel of the base carrier.

71. The apparatus of claim 49, wherein the processor is further configured to transmit data on an uplink on the base carrier.

72. The apparatus of claim 71, wherein the processor is further configured to transmit data on the uplink in the extension carrier concurrently with the transmission of the data on the uplink in the base carrier.

73. A non-transitory computer-readable medium comprising code that when executed on a processor instructs the processor to perform operations of:
- receiving extended bandwidth information indicating availability of an extended bandwidth, the extended bandwidth including a base carrier and an extension carrier within a legacy guard band of the base carrier;
- receiving data on a downlink in the extension carrier within the legacy guard band of the base carrier based on the extended bandwidth information, wherein the downlink is within a legacy composite bandwidth, wherein the extension carrier is operated within the extended bandwidth, wherein the extended bandwidth is within the legacy composite bandwidth, and wherein the extended bandwidth comprises a base bandwidth of the base carrier, an upper extended bandwidth in an upper legacy guard band of the base carrier, and a lower extended bandwidth in a lower legacy guard band of the base carrier; and
- receiving control information on the downlink in a control channel that extends (a) across the extended bandwidth into the extension carrier in a first set of subframes and (b) across and within the base bandwidth of the base carrier in a second set of subframes.

* * * * *